US012645176B2

(12) United States Patent
Kubota

(10) Patent No.: US 12,645,176 B2
(45) Date of Patent: Jun. 2, 2026

(54) IMAGE FORMING APPARATUS INCLUDING FIXING UNIT THAT IS INTERCHANGABLE WITH OTHER FIXING UNITS AND METHOD OF OPERATING IMAGE FORMING APPARATUS

(71) Applicant: SHARP KABUSHIKI KAISHA, Sakai City (JP)

(72) Inventor: Kazuhisa Kubota, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/789,834

(22) Filed: Jul. 31, 2024

(65) Prior Publication Data

US 2025/0053125 A1 Feb. 13, 2025

(30) Foreign Application Priority Data

Aug. 9, 2023 (JP) ................................ 2023-130457

(51) Int. Cl.

| | |
|---|---|
| ***G03G 15/16*** | (2006.01) |
| ***G03G 15/00*** | (2006.01) |
| ***G03G 15/20*** | (2006.01) |

(52) U.S. Cl.
CPC ..... *G03G 15/2064* (2013.01); *G03G 15/5016* (2013.01)

(58) Field of Classification Search
CPC ........... G03G 15/2039; G03G 15/2064; G03G 15/5016; G03G 21/1685
See application file for complete search history.

(56) References Cited

U.S. PATENT DOCUMENTS

2009/0041481 A1* 2/2009 Iida .................... G03G 15/5079 399/12
2015/0331370 A1* 11/2015 Nagata .............. G03G 15/2039 399/323

FOREIGN PATENT DOCUMENTS

JP 2017-003725 A 1/2017

* cited by examiner

*Primary Examiner* — Hoang X Ngo
(74) *Attorney, Agent, or Firm* — ScienBiziP, P.C.

(57) ABSTRACT

An image forming apparatus includes one or more controllers; a display; and a fixing unit. The fixing unit is attachable to and detachable from the image forming apparatus. When the fixing unit is replaced to an other fixing unit, the one or more controllers display, on the display, a fixing unit designation request that requests an input for designating the other fixing unit.

10 Claims, 30 Drawing Sheets

IMAGE FORMING APPARATUS INCLUDING FIXING UNIT THAT IS INTERCHANGABLE WITH OTHER FIXING UNITS AND METHOD OF OPERATING IMAGE FORMING APPARATUS

CROSS-REFERENCE TO RELATED APPLICATION

The present application claims priority from Japanese Application JP2023-130457, the content of which is hereby incorporated by reference into this application.

BACKGROUND OF THE INVENTION

1. Field of the Invention

The present disclosure relates to an image forming apparatus and a method of operating an image forming apparatus.

2. Description of the Related Art

Conventionally, as a printing system of an image forming apparatus such as a printer or a multi function peripheral, there is a dry electrophotographic system (laser printer system). In a laser printer system, an image is formed on a sheet by transferring toner, and then the image on the sheet is heated and pressurized, thereby fixing the image on the sheet. For this reason, an image forming apparatus that performs printing by the laser printer system includes a fixing device for heating and pressurizing an image on a sheet.

The fixing device includes a fixing member that comes into contact with a sheet on which an image to be fixed is formed. The fixing member is, for example, a fixing belt. The fixing belt is disposed in such a way that its longitudinal direction is orthogonal to a transport direction of a sheet. In the present application, the width of a sheet in a direction orthogonal to the sheet transport direction is referred to as a sheet width. For example, in a general multi function printer (MFP) having a scanner function, a sub scanning direction of a scanner coincides with the sheet transport direction, and a main scanning direction of the scanner is orthogonal to the sheet transport direction. Therefore, in a general MFP, a sheet width refers to the width of a sheet in the main scanning direction.

FIG. 29A is a diagram for describing a scratch generated on a fixing belt when an A5 sheet repeatedly passes. When an A5 sheet 301 repeatedly passes on a fixing belt 303, scratches 305 and 307 are generated on the fixing belt 303 at a position associated with a sheet width of the A5 sheet 301. A case is considered in which, after these scratches are generated, an A3 sheet 309 larger than the A5 sheet repeatedly passes on the same fixing belt 303.

At this occasion, as illustrated in FIG. 29B, although scratches 311 and 313 are generated on the fixing belt 303 at a position associated with a sheet width of the A3 sheet 309, since the scratches 311 and 313 are substantially on the outside of the A3 sheet 309, the scratches 311 and 313 do not affect print quality of the A3 sheet 309. However, the scratches 305 and 307 caused by the A5 sheet 301 lie within the sheet width of the A3 sheet 309, which adversely affects the print quality of the A3 sheet 309. Specifically, stains 315 and 317 are generated on the A3 sheet 309 at a position associated with the scratches 305 and 307 caused by the A5 sheet 301.

In order to avoid this problem, it has been considered to use and operate the fixing belt only for printing of a specific sheet width. Namely, as illustrated in FIG. 30A, the fixing belt 303 is used when the A5 sheet 301 is printed, whereas, as illustrated in FIG. 30B, another fixing belt 321 is used when the A3 sheet 309 is printed. Although the scratches 305 and 307 are generated on the fixing belt 303 by repeatedly printing, and the scratches 311 and 313 are generated on the fixing belt 321, since a fixing belt is prepared for each sheet width, it is possible to avoid that scratches generated by printing a sheet of an other sheet width adversely affect print quality.

As described above, another operation method in which a fixing belt or a fixing device is known in the related art. Types of media that can pass are diversified, and it is necessary to finely adjust a fixing condition that determines final image quality, depending on a thickness and surface properties of the media, a density and glossiness of an image of a product to be acquired, and the like. As a countermeasure against these problems, it has been proposed in the related art that a dedicated fixing device depending on a size of a sheet that passes or a type of a medium is prepared, a user replaces the fixing device as necessary, whereby optimum image quality can be acquired.

In general, a fixing device after operation reaches a high temperature, and therefore, when the fixing device is replaced, it is required to perform replacement work in consideration of the high temperature.

In this regard, in the related art, it has been proposed to notify a user of whether a temperature of a mounted fixing device is lowered to a predetermined temperature or lower.

SUMMARY OF THE INVENTION

The replacement and operation of the fixing device of the image forming apparatus are disclosed in, for example, the related art. In a case where a plurality of fixing devices of the same type are selectively used for operation in accordance with the sheet width, the plurality of fixing devices are completely the same in appearance and cannot be discriminated at a glance. In addition, as described in the related art, even in a case where a dedicated fixing device depending on a size of a sheet that passes or a type of a medium is prepared, appearances of the fixing devices are extremely similar to each other, and thus it is also difficult to distinguish the fixing devices.

An aspect of the present disclosure has been made in view of such a situation, and therefore provides an image forming apparatus capable of operating a plurality of fixing devices in a clearly distinguished manner, and a method of operating the image forming apparatus.

In order to solve the above-described problem, an aspect of the present disclosure is to provide an image forming apparatus including one or more controllers, a display, and a fixing unit, in which the fixing unit is attachable to and detachable from the image forming apparatus, and when the fixing unit is replaced with an other fixing unit, one or more controllers display, on the display, a fixing unit designation request that requests an input for designating the other fixing unit.

Further, an aspect of the present disclosure is to provide an operation method of an image forming apparatus provided with one or more controllers, a display, and a fixing unit, and the fixing unit is detachable. The operation method includes: removing, from the image forming apparatus, a first fixing unit being mounted; mounting, to the image forming apparatus, a second fixing unit different from the first fixing unit; and causing the one or more controllers to display, on the display, a fixing unit designation request that requests an input for designating the second fixing unit.

According to an aspect of the present disclosure, it is possible to provide an image forming apparatus capable of operating a plurality of fixing devices in a clearly distinguished manner.

DETAILED DESCRIPTION OF THE INVENTION

1. First Embodiment

1.1 Functional Configuration of Image Forming Apparatus 1

Figure 1:
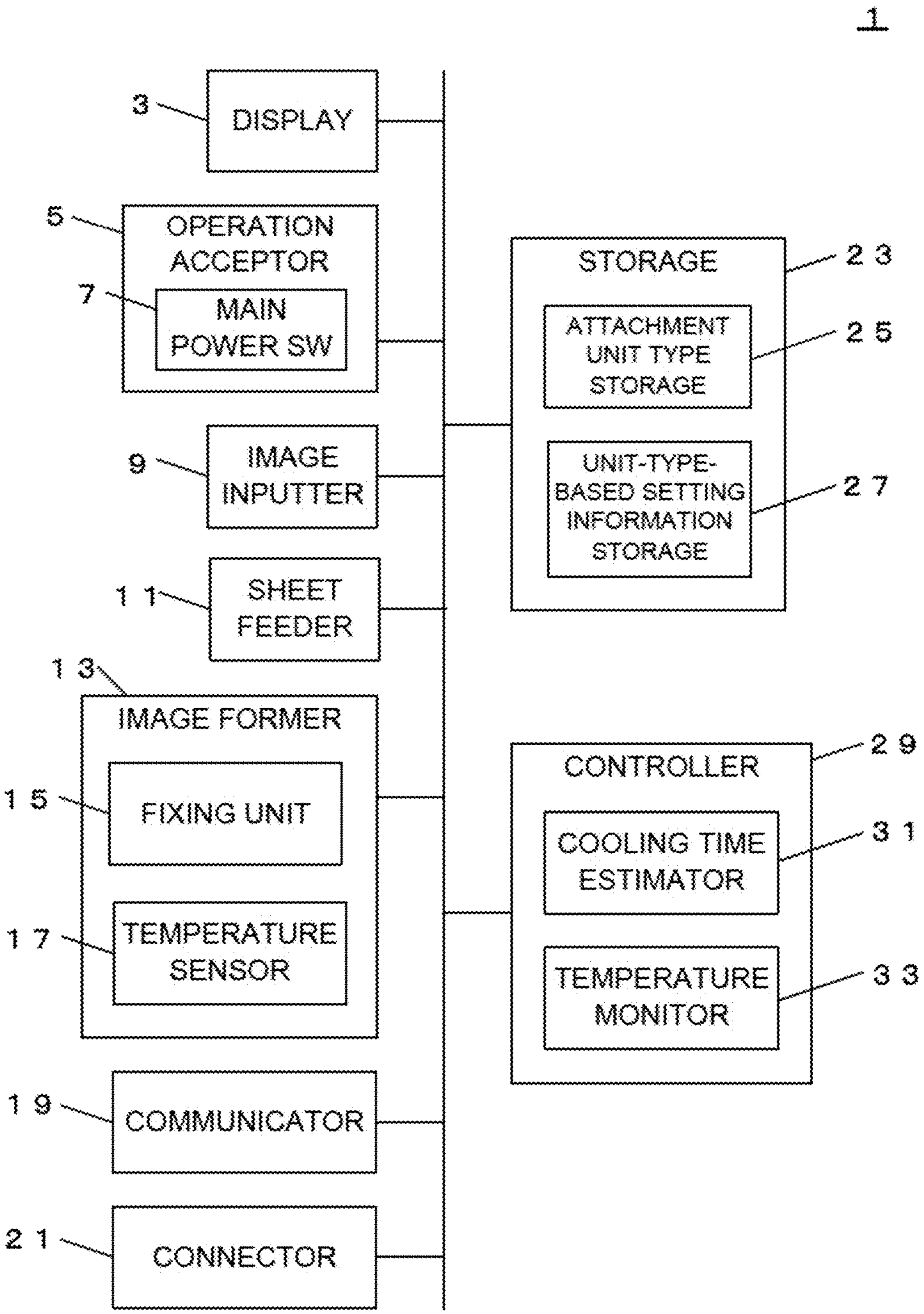
FIG. 1 is a functional block diagram of an image forming apparatus according to a first embodiment of the present disclosure.

FIG. 1 is a functional block diagram of an image forming apparatus 1 according to a first embodiment of the present disclosure. The image forming apparatus 1 is a multi function printer (MFP) or a multi function peripheral, and typically has a copy function, an image scanner function, a facsimile function, and a printer function. The image forming apparatus 1 may further include other functions, for example, an e-mail transmission/reception function, a file server function, and the like.

The image forming apparatus 1 includes a display 3, an operation acceptor 5, an image inputter 9, a sheet feeder 11, an image former 13, a communicator 19, a connector 21, a storage 23, and a controller 29. The operation acceptor 5 includes a main power SW7. The image former 13 includes a fixing unit 15 and a temperature sensor 17. The storage 23 includes an attachment unit type storage 25 and a unit-type-based setting information storage 27. The controller 29 includes a cooling time estimator 31 and a temperature monitor 33.

The display 3 is a functional part for displaying an image and a character. For example, the display 3 is configured of a liquid crystal display (LCD), an organic electro-luminescence (EL) panel, or the like. The display 3 may be a single display device or may further include a display device connected to the outside.

The operation acceptor 5 accepts an operation input from a user. For example, the operation acceptor 5 is configured of hardware keys or software keys. Further, the operation acceptor 5 includes, for example, a task key that executes a task, such as FAX transmission and image reading, a stop key that stops an operation, and the like. Further, the operation acceptor may include a physical operation key, such as a task key, a stop key, a power key, and a power saving key. The main power SW7 is a switch for turning on and off the main power of the image forming apparatus 1.

The display 3 and the operation acceptor 5 may be integrally configured. For example, a touch panel display may be used as the display 3 and the operation acceptor 5.

The image inputter 9 reads an image (document), and outputs the image, as image data. The image inputter 9 is configured of a general scanner (image input device). Further, the image inputter 9 may input image data from an external storage medium, for example, such as a USB memory, or may receive an image via a network. A sub scanning direction of the image inputter 9 coincides with a sheet transport direction by the sheet feeder 11.

The sheet feeder 11 includes a sheet feed tray that accommodates a medium such as paper, and a transport mechanism that transports the medium from the sheet feed tray to the image former 13. In addition, the sheet feeder 11 may include a sorter mechanism that sorts a medium (sheet) on which an image is formed, a sheet discharge tray for discharging the medium on which the image is formed, and a transport mechanism that transports the medium on which the image is formed to the sorter mechanism and the sheet discharge tray. Furthermore, the sheet feeder 11 may include a transport mechanism that transports a medium on which an image is formed to the image inputter 9, and a transport mechanism that transports the medium from which the image is read by the image inputter 9 to the sheet discharge tray, the sorter mechanism, or the like.

The sheet feeder 11 transports a medium along the sub scanning direction of the image inputter 9. In the present application, as described above, the width of a sheet in a direction orthogonal to the transport direction of a medium (sheet) is referred to as a sheet width. Therefore, in the present embodiment, the sheet width can also be referred to as a width of a sheet in the main scanning direction of the image inputter 9. The sheet feeder 11 transports a medium in such a way that a longitudinal direction of an unillustrated fixing belt of the fixing unit 15, and a transport direction of a medium are orthogonal to each other.

The image former 13 forms (prints) an image on a medium such as a copy sheet, based on image data. A printing system of the image former 13 is a laser printer. The image former 13 may also be a monochrome laser printer or a color laser printer. The image former 13 may include a sheet feeding mechanism that supplies a medium, a transport mechanism that transports the medium, a sorter mechanism that sorts the medium after image formation, and the like. The fixing unit 15 is a fixing device, and fuses a toner image on a sheet by applying heat and pressure to the toner image transferred on the sheet. The temperature sensor 17 is a sensor that measures a temperature of the fixing unit 15. The temperature sensor 17 converts a temperature of the fixing unit 15 to a physical amount such as a voltage or a resistance value, and outputs the physical amount.

The communicator 19 is a functional part for connecting to a network. The communicator 19 is configured of, for example, an interface connectable to a wired local area network (LAN), a wireless LAN, or a long term evolution (LTE) network. By connecting the communicator 19 to a network, the communicator 19 is connected to an other device or an external network.

The connector 21 connects the image forming apparatus 1 to an other device. The connector 21 is, for example, a USB interface, and is connected to a USB memory or the like. Further, the connector 21 may be configured in such a way as to include a device (e.g., an antenna or the like) for performing short-range wireless communication such as near field communication (NFC), or Bluetooth (registered trademark).

Further, the communicator 19 and the connector 21 may be integrally configured. For example, a single wireless communication interface may be provided, and a wireless LAN or Bluetooth may be usable.

The storage 23 is a functional part in which various programs necessary for an operation of the image forming apparatus 1, and various pieces of data are stored. The storage 23 is the one including a temporarily storable recording device such as a dynamic random access memory (DRAM), and a non-transitory recording device such as a solid state drive (SSD) configured of a semiconductor memory or a hard disk drive (HDD) configured of a magnetic disk, for example. Further, although the storage 23 is configured as a single configuration for convenience of explanation, the storage 23 may be configured as separate devices for each individual purpose, such as an area (primary storage area) used for execution of a program, an area (auxiliary storage area) for storing a program and data, and an area used for caching.

The attachment unit type storage 25 stores a type (unit type) of the fixing unit 15 currently mounted to the image forming apparatus 1. The unit type is associated with a type of a sheet on which an image is fixed by using the fixing unit. The type of a sheet is, for example, any of a sheet width, a sheet material, a thickness, a shape (an envelope), or the like, or a combination thereof. The type of a sheet based on a sheet width includes, for example, a long side (420 mm) of A3 size, a short side of A3 size and a long side (297 mm) of A4 size, a short side of A4 size and a long side (210 mm) of A5 size, and the like. Also, a long side (515 mm) of B3 size, a short side of B3 size and a long side (364 mm) of B4 size, a short side of B4 size and a long side (257 mm) of B5 size, and the like are included.

The unit-type-based setting information storage 27 stores setting information of the image forming apparatus 1 defined for each unit type. The setting information for each unit type includes, for example, basis weight settings, a sheet type, a sheet attribute, fixing temperature settings, fixing pressure settings, primary transfer current value settings, secondary transfer current value settings, and pre transfer charger (PTC) current value settings. The basis weight settings are settings on a weight per sheet of one square meter. The sheet type is settings on a type of a sheet, and includes, for example, non-coated paper, gloss coated paper, matte coated paper, embossed paper, and the like. The sheet attribute is settings on an attribute of a sheet, and, for example, settings are made as to whether there is a front or a back of a sheet, or whether double-sided printing is not available. The fixing temperature settings are settings on a temperature generated by the fixing unit 15, when a toner image is fixed. The fixing pressure settings are settings on strength of pressure to be applied to a sheet by the fixing unit 15, when a toner image is fixed. The primary transfer current value settings are settings on magnitude of electric current for adhering toner on an intermediate transfer belt of the fixing unit 15, and settings are made for each color of black (Bk), cyan (C), magenta (M), and yellow (Y). The secondary transfer current value settings are settings on magnitude of electric current for adhering toner formed on the intermediate transfer belt to a sheet, and settings are made for each of a front and a back of a sheet. The PTC current value settings are settings on magnitude of electric current with which electric charges are applied to toner to be transferred.

The controller 29 is a functional part for controlling the entirety of the image forming apparatus 1. The controller 29 is configured of one or more controllers and a control circuit, and, for example, is configured of a central processing unit (CPU) or a system on a chip (SoC).

Further, the controller 29 can achieve each function by reading a program stored in the storage 23, and executing processing.

The cooling time estimator 31 estimates, based on a current temperature of the fixing unit 15 measured by the temperature sensor 17, a time until the temperature of the fixing unit 15 is lowered to a degree at which the fixing unit 15 can be removed from the image former 13.

The temperature monitor 33 monitors a current temperature of the fixing unit 15 measured by the temperature sensor 17 in real time.

1.2 Operation of Image Forming Apparatus 1 in First Embodiment

Figure 2:
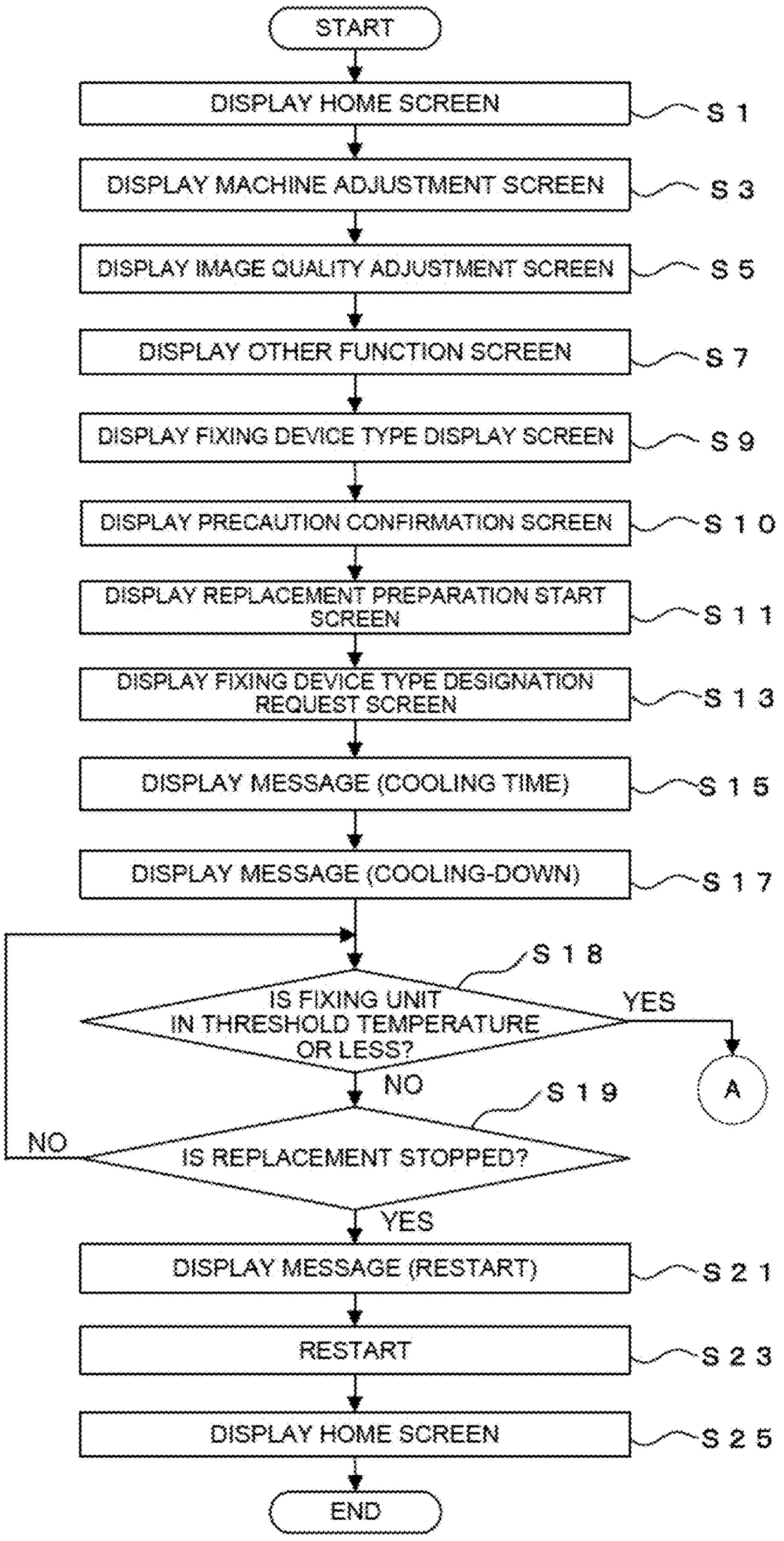
FIG. 2 is a flowchart for describing a replacement work of a fixing unit in the image forming apparatus according to the first embodiment of the present disclosure.
Figure 3:
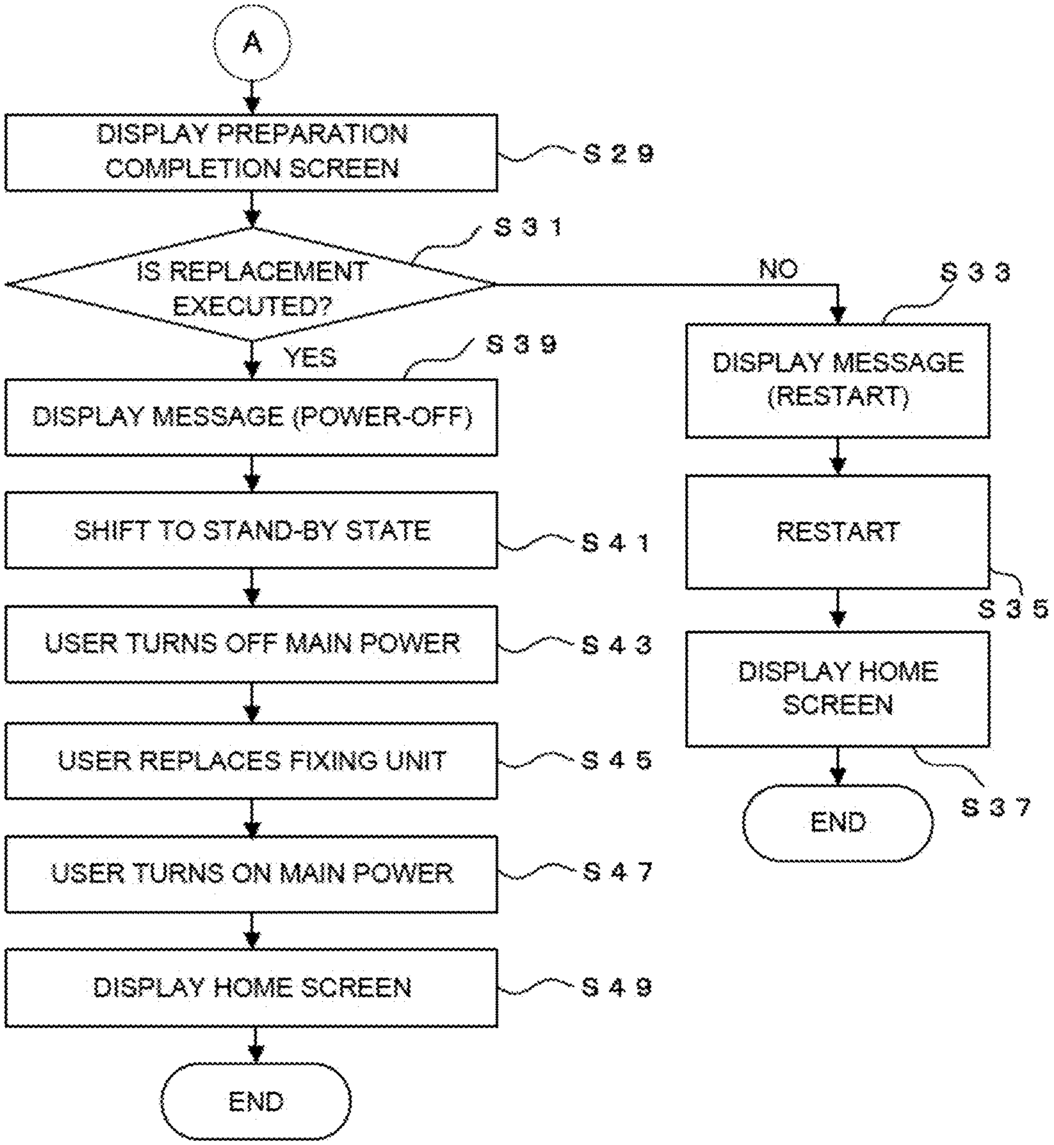
FIG. 3 is a flowchart for describing a replacement work of a fixing unit in the image forming apparatus according to the first embodiment of the present disclosure.

FIGS. 2 and 3 are flowcharts for describing an operation of the image forming apparatus 1 when the fixing unit 15 is replaced. The replacement to be described herein is replacement for changing the unit type of the fixing unit.

The controller 29 displays a home screen on the display 3 (step S1). Next, the controller 29 displays a machine adjustment screen on the display 3 (step S3). Next, the controller 29 displays an image quality adjustment screen on the display 3 (step S5). Next, the controller 29 displays an other function screen on the display 3 (step S7). Next, the controller 29 displays a fixing device type display screen before replacement on the display 3 (step S9). Next, the controller 29 displays a precaution confirmation screen on the display 3 (step S10). Next, the controller 29 displays a replacement preparation start screen on the display 3 (step S11). Next, the controller 29 displays a fixing device type designation request screen on the display 3 (step S13). Next, the controller 29 displays a message indicating a time required for cooling the fixing unit 15 on the display 3 (step S15). Next, the controller 29 displays, on the display 3, a message indicating that the temperature of the fixing unit 15 currently mounted is waiting to be lowered to a predetermined value (step S17).

Herein, the controller 29 compares the current temperature of the fixing unit 15 measured by the temperature sensor 17 with a predetermined threshold temperature stored in advance in the storage 23 (step S18). When the temperature of the fixing unit 15 is higher than the threshold temperature (NO in step S18), and there is no input to stop the replacement work (NO in step S19), the controller 29 returns to step S18.

When the temperature of the fixing unit 15 is higher than the threshold temperature (NO in step S18) and there is an input to stop the replacement work (YES in step S19), the controller 29 displays a message to restart the image forming apparatus 1 on the display 3 (step S21), and restarts the image forming apparatus 1 (step S23). After the restart, the controller 29 displays the home screen on the display 3 (step S25).

When the temperature of the fixing unit 15 is equal to or lower than the threshold temperature (YES in step S18), the controller 29 displays a preparation completion screen on the display 3 (step S29).

After displaying the preparation completion screen, when the fixing unit 15 is not replaced (NO in step S31), the controller 29 displays a message to restart the image forming apparatus 1 on the display 3 (step S33), and restarts the image forming apparatus 1 (step S35). After the restart, the controller 29 displays the home screen on the display 3 (step S37).

After displaying the preparation completion screen, when the fixing unit 15 is replaced (YES in step S31), the controller 29 causes the display 3 to display a message indicating that the power of the image forming apparatus 1 is being disconnected (step S39), and causes the image forming apparatus 1 to shift to a standby state (step S41). In the standby state, the display 3 is turned off. The user cannot use functions related to printing, such as a copy function and a printer function. However, it may be possible to perform only reception of a job of a facsimile function or the printer function and hold data relating to the job.

After the image forming apparatus 1 shifts to the standby state, the controller 29 turns off the main power of the image forming apparatus 1 (power-off state), based on the operation of a main power switch 7 of the image forming apparatus 1 by the user (step S43). In the power-off state, the operation of the entire image forming apparatus 1 is stopped. At this occasion, the user cannot use all the functions of the image forming apparatus 1.

After shifting to the power-off state, the user performs replacement work of the fixing unit 15 (step S45). More specifically, the user opens an unillustrated housing of the image forming apparatus 1, and replaces the fixing unit 15 currently mounted to the image former 13 with another fixing unit 15. After replacement of the fixing unit 15, when the user closes the unillustrated housing of the image forming apparatus 1, the replacement work is finished.

After completion of the replacement work, the controller 29 turns on the main power supply of the image forming apparatus 1 (power-on state), based on the operation of the main power switch 7 by the user again (step S47). After shifting to the power-on state, the controller 29 shifts to a normal operation state autonomously or in response to a predetermined operation performed by the user via the operation acceptor 5, and causes the display 3 to display the home screen (step S49).

1.3 Screen Example of Image Forming Apparatus 1 in First Embodiment

An example of a screen to be displayed on the display 3 when the fixing unit 15 is replaced is described. Herein, the display 3 and the operation acceptor 5 are integrally configured as a touch panel display.

Figure 4:
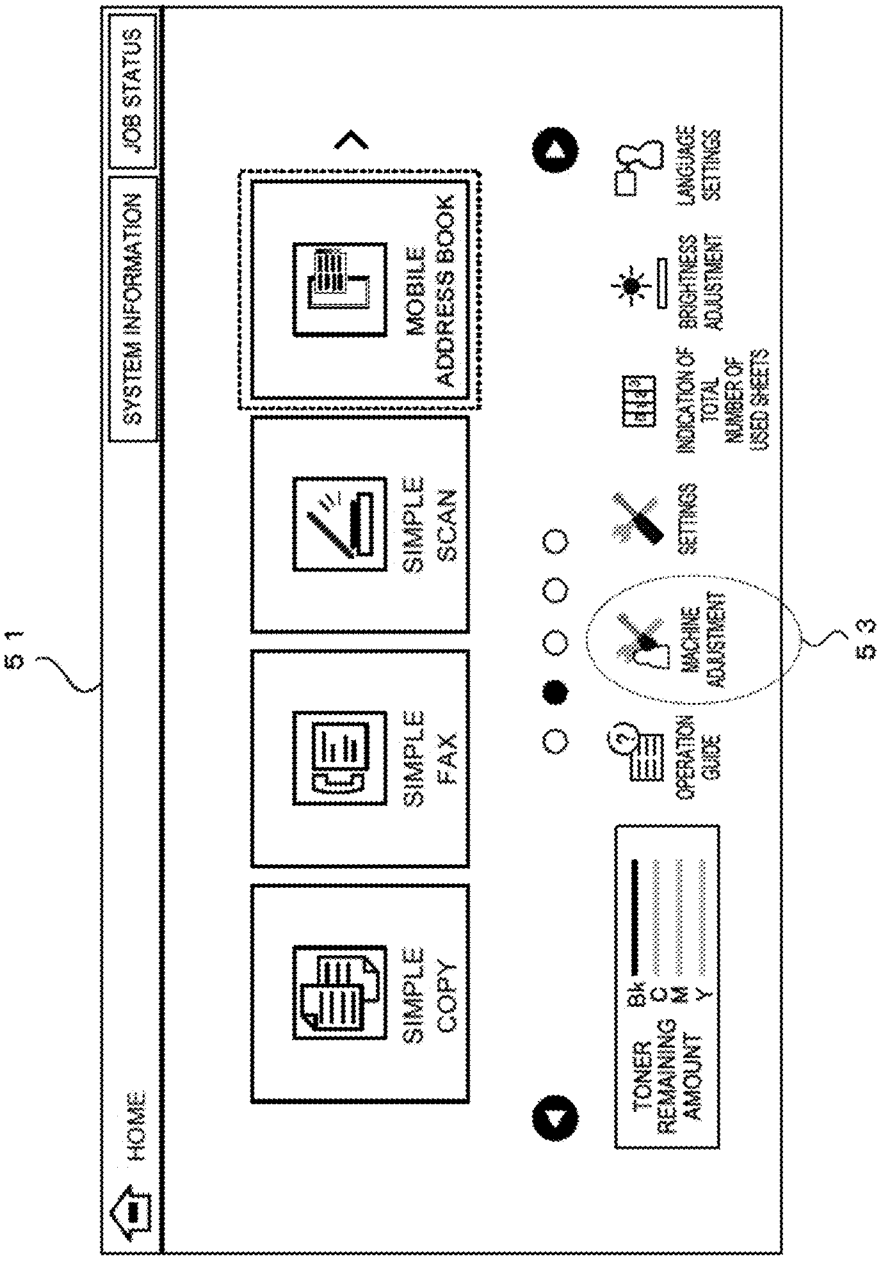
FIG. 4 is a diagram illustrating an example of a home screen to be displayed on a display of the image forming apparatus when a fixing unit is replaced in the first embodiment of the present disclosure.

FIG. 4 is a diagram illustrating an example of a home screen to be displayed on the display 3 of the image forming apparatus 1 when the fixing unit 15 is replaced in the first embodiment of the present disclosure. A home screen 51 is a screen to be displayed on the display 3 by the controller 29 after the main power of the image forming apparatus 1 is turned on from an off state. The home screen 51 includes a machine adjustment button 53. The controller 29 displays, for example, the home screen 51 on the display 3 in step S1. When the user touches the machine adjustment button 53, the controller 29 displays a machine adjustment screen 55, which is described next.

Figure 5:
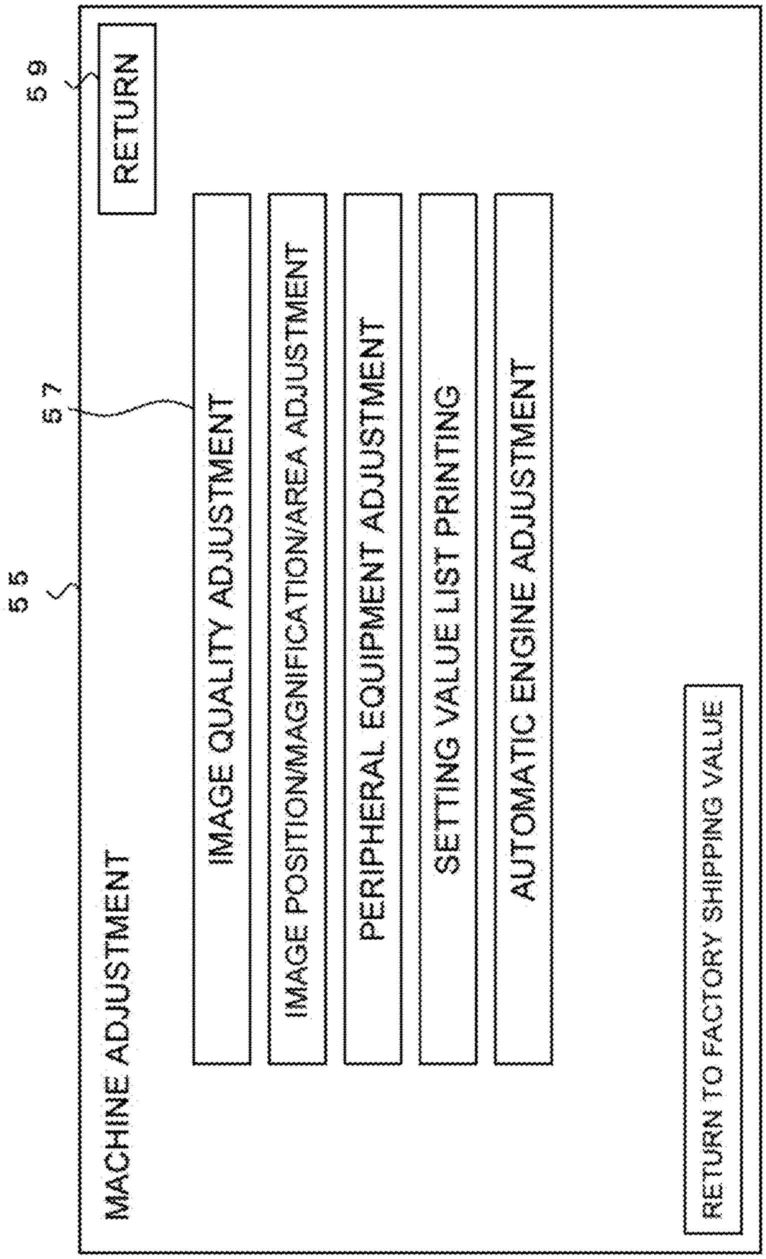
FIG. 5 is a diagram illustrating an example of a machine adjustment screen to be displayed on the display of the image forming apparatus when the fixing unit is replaced in the first embodiment of the present disclosure.

FIG. 5 is a diagram illustrating an example of a machine adjustment screen to be displayed on the display 3 of the image forming apparatus 1 when the fixing unit 15 is replaced in the first embodiment of the present disclosure. In step S1, when the user touches the machine adjustment button 53 while the home screen 51 is displayed on the display 3, the controller 29 proceeds to step S3 and displays the machine adjustment screen 55 on the display 3. The machine adjustment screen 55 is a menu screen related to various pieces of adjustment work of the image forming apparatus 1. The machine adjustment screen 55 includes an image quality adjustment button 57. The image quality adjustment button 57 is an area to be touched when the control proceeds to an image quality adjustment screen, which is described next.

Figure 6:
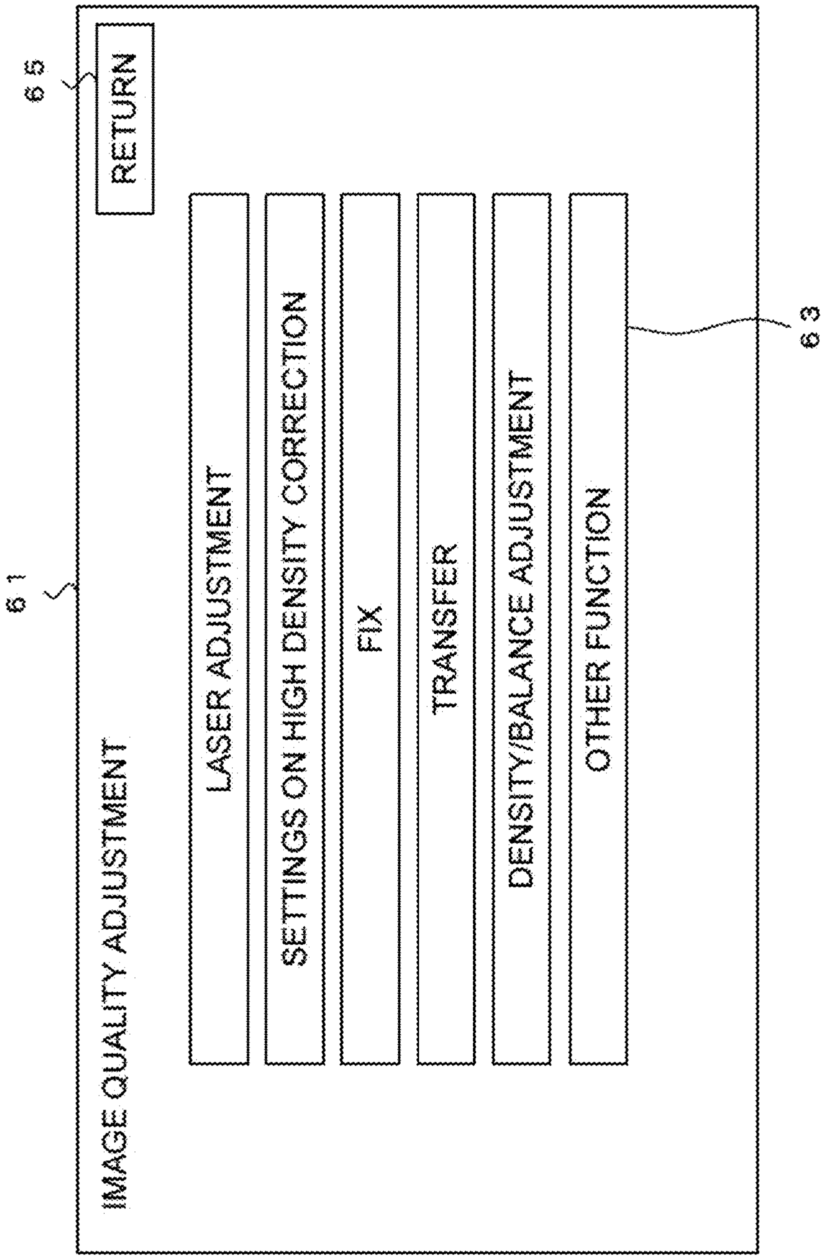
FIG. 6 is a diagram illustrating an example of an image quality adjustment screen to be displayed on the display of the image forming apparatus when the fixing unit is replaced in the first embodiment of the present disclosure.

FIG. 6 is a diagram illustrating an example of an image quality adjustment screen to be displayed on the display 3 of the image forming apparatus 1 when the fixing unit 15 is replaced in the first embodiment of the present disclosure. In step S3, when the user touches the image quality adjustment button 57 while the machine adjustment screen 55 is displayed on the display 3, the controller 29 proceeds to step S5 and displays an image quality adjustment screen 61 on the display 3. The image quality adjustment screen 61 is a menu screen related to image quality adjustment of an image to be formed on a sheet by the image former 13. The image quality adjustment screen 61 includes an other function button 63. The other function button 63 is an area to be touched when the control proceeds to an other function screen 67, which is described next.

Figure 7:
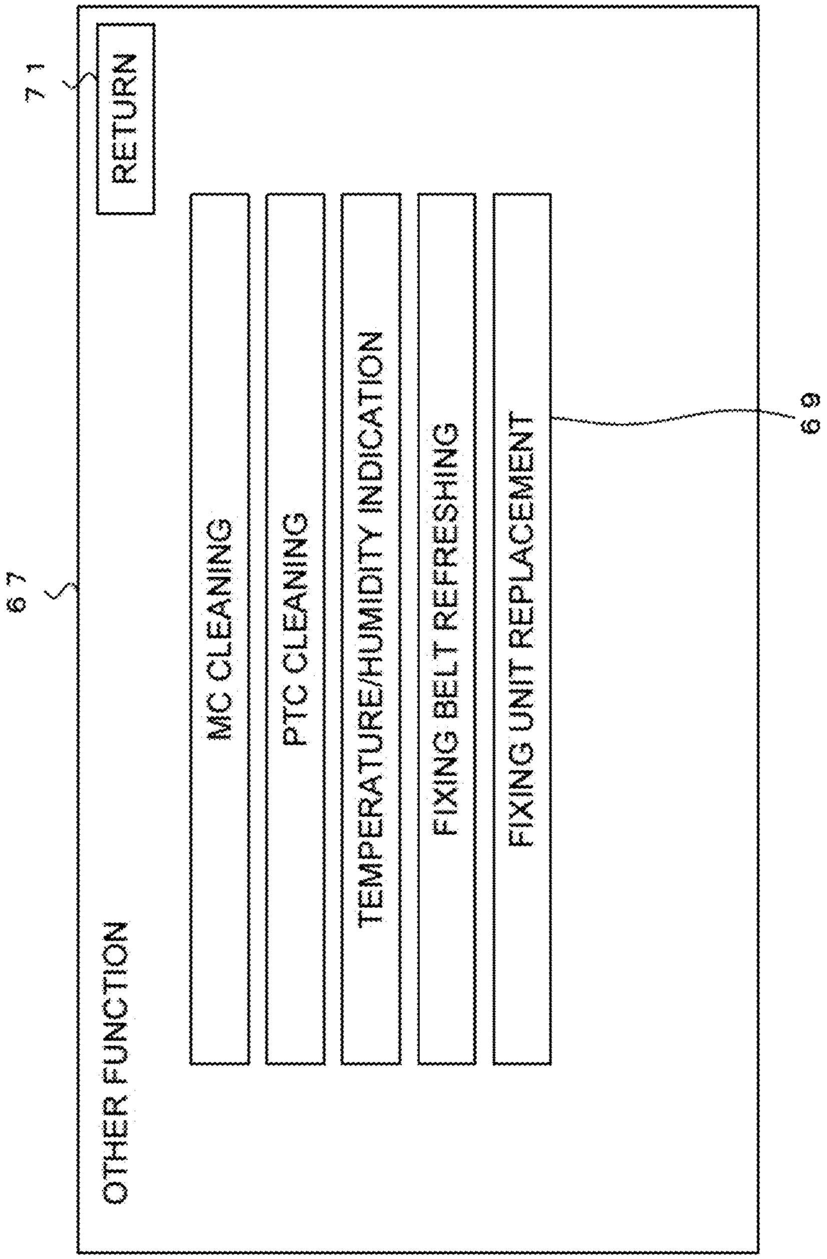
FIG. 7 is a diagram illustrating an example of an other function screen to be displayed on the display of the image forming apparatus when the fixing unit is replaced in the first embodiment of the present disclosure.

FIG. 7 is a diagram illustrating an example of an other function screen to be displayed on the display 3 of the image forming apparatus 1 when the fixing unit 15 is replaced in the first embodiment of the present disclosure. In step S5, when the user touches the other function button 63 while the image quality adjustment screen 61 is displayed on the display 3, the controller 29 proceeds to step S7 and displays the other function screen 67 on the display 3. The other function screen 67 is a menu screen related to image quality adjustment of an image to be formed on a sheet by the image former 13. The other function screen 67 includes a fixing unit replacement button 69. The fixing unit replacement button 69 is an area to be touched when the control proceeds to a fixing device type display screen 73, which is described next.

Figure 8:
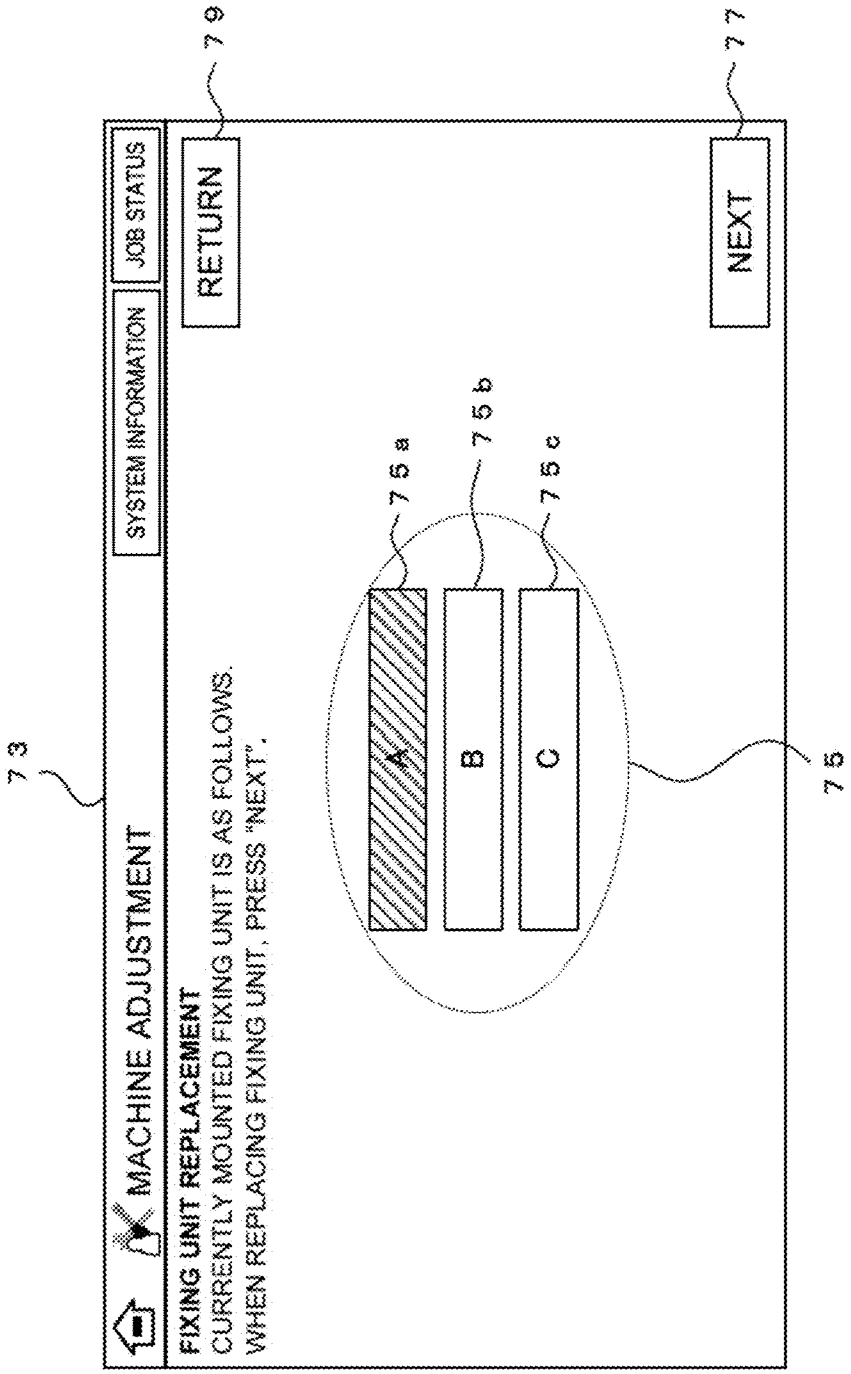
FIG. 8 is a diagram illustrating an example of a fixing device type display screen to be displayed on the display of the image forming apparatus when the fixing unit is replaced in the first embodiment of the present disclosure.

FIG. 8 is a diagram illustrating an example of a fixing device type display screen to be displayed on the display 3 of the image forming apparatus 1 when the fixing unit 15 is replaced in the first embodiment of the present disclosure. In step S7, when the user touches the fixing unit replacement button 69 while the other function screen 67 is displayed on the display 3, the controller 29 proceeds to step S9 and displays the fixing device type display screen 73 on the display 3.

The fixing device type display screen 73 is a screen that displays a unit type of the fixing unit 15 currently mounted to the image forming apparatus 1. The fixing device type display screen 73 includes a unit type list 75. In the unit type list 75, unit types A75*a*, B75*b*, and C75*c* are displayed.

Among these unit types, the controller 29 displays, on the display 3 (e.g., reverse display or emphasis display), a unit type of the currently mounted fixing unit 15 in a selected state, based on a unit type stored in the mounted unit type storage 25. The fixing device type display screen 73 is a display example in a case where the fixing unit 15 currently mounted to the image forming apparatus 1 is of the unit type A. The unit type stored in the attachment unit type storage 25 is, for example, registered via the operation acceptor 5, when the user performs initial settings on the image forming apparatus 1. Thereafter, the unit type stored in the attachment unit type storage 25 is updated by a unit type designated on a fixing device type designation request screen in step S13 to be described below.

As described above, displaying a unit type of the currently mounted fixing unit 15 allows the user to easily recognize of which unit type, the currently mounted fixing unit 15 is. Further, this enables to prevent that the user replaces to a fixing unit 15 of another unit type by mistake.

When it is determined that it is not necessary to change the unit type of the fixing unit 15 at this time of confirmation, the user can cancel replacement of the fixing unit by touching a return button 79. When the fixing unit is replaced even after this confirmation, the user touches a next button 77. When the next button 77 is touched, the controller 29 proceeds to step S11.

Figure 9:
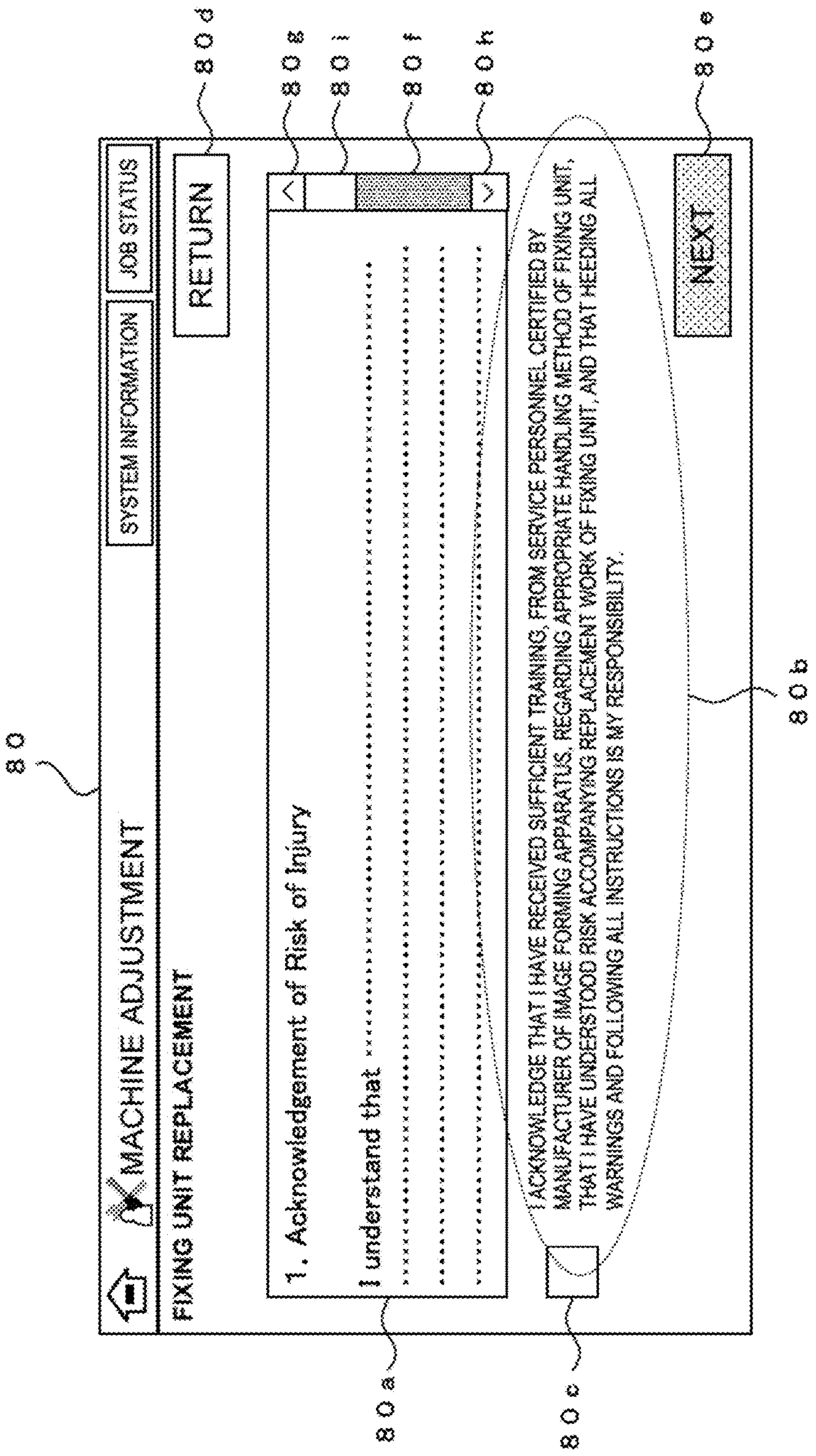
FIG. 9 is a diagram illustrating an example of a precaution confirmation screen to be displayed on the display of the image forming apparatus when the fixing unit is replaced in the first embodiment of the present disclosure.

FIG. 9 is a diagram illustrating an example of a precaution confirmation screen to be displayed on the display 3 of the image forming apparatus 1 when the fixing unit 15 is replaced in the first embodiment of the present disclosure. In step S9, when the user touches the next button 77 while the fixing device type display screen 73 is displayed on the display 3, the controller 29 proceeds to step S10 and displays a precaution confirmation screen 80 on the display 3.

The precaution confirmation screen 80 is a screen for informing various precautions related to the replacement work to the user who performs the replacement work of the fixing unit 15, before the replacement work, and also requesting the user to confirm what has been informed. The precaution confirmation screen 80 includes a precaution display field 80*a*, an affidavit display field 80*b*, a check field 80*c*, a return button 80*d*, a next button 80*e*, and a scroll bar 80*f*.

The precaution display field 80*a* displays a message addressed to the user who performs replacement work. The message in the precaution display field 80*a* may be a list of precautions regarding replacement work. In addition to or instead of a message as described above, a message in the precaution display field 80*a* may be the one that informs the user who performs replacement work of a risk of injury, burns, or the like during the replacement work. Note that, the entirety of the message may not be displayed at once in the precaution display field 80*a*. The message to be displayed in the precaution display field 80*a* is scrolled up and down in response to an operation of the scroll bar 80*f* via the operation acceptor 5. In the precaution display field 80*a*, the entirety of the message can be browsed by scrolling.

A message for the user who performs replacement work to express that the user has received sufficient training for an appropriate handling method of the fixing unit before the replacement work, that the user has understood a risk involved in the replacement work, and the like is written in the affidavit display field 80*b*. When the user agrees to the message in the affidavit display field 80*b*, the user checks the check field 80*c* via the operation acceptor 5. The check field 80*c* is not checked on the precaution confirmation screen 80. When the check field 80*c* is not checked, the next button 80*e* is grayed out. The gray-out display indicates that the next button 80*e* is currently in a non-selectable state.

The scroll bar 80*f* includes an up arrow button 80*g*, a down arrow button 80*h*, and a knob 80*i*. The scroll bar 80*f* is operated by the user via the operation acceptor 5 in order to scroll a message displayed in the precaution display field 80*a*. When the up arrow button 80*g* is touched via the operation acceptor 5, the message displayed in the precaution display field 80*a* is allowed to be scrolled upward. Likewise, when the down arrow button 80*h* is touched, the message is allowed to be scrolled downward. Instead of touching the up arrow button 80*g* or the down arrow button 80*h*, the user is allowed to scroll the message displayed in the precaution display field 80*a* up and down by moving the knob 80*i* up and down, while touching the knob 80*i* via the operation acceptor 5.

Figure 10:
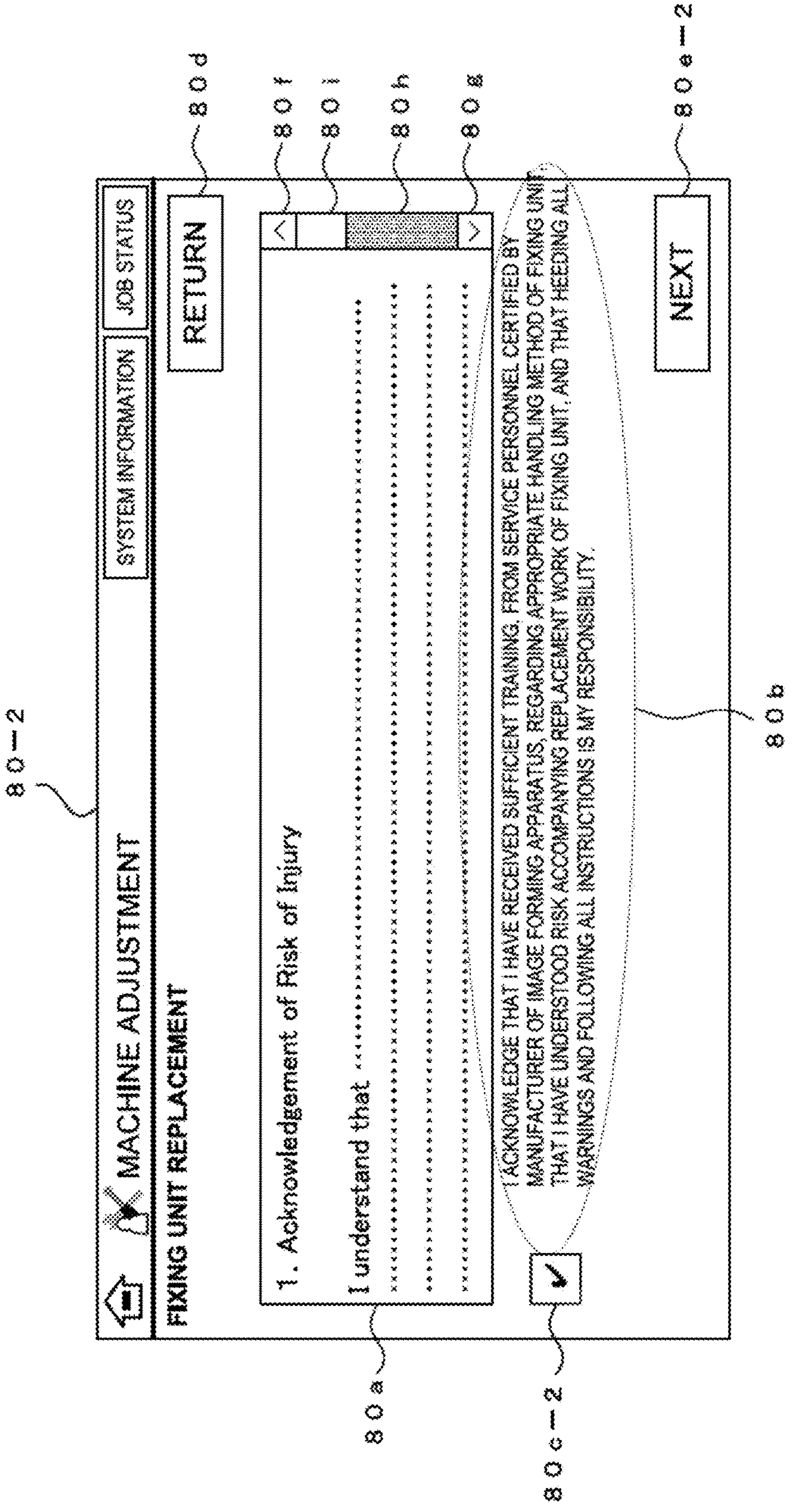
FIG. 10 is a diagram illustrating an example of a precaution confirmation screen to be displayed on the display of the image forming apparatus when the fixing unit is replaced in the first embodiment of the present disclosure.

On the precaution confirmation screen 80, when an operation of checking the check field 80*c* is performed via the operation acceptor 5, the controller 29 shifts a screen to be displayed on the display 3 from the precaution confirmation screen 80 to a precaution confirmation screen 80-2 illustrated in FIG. 10. FIG. 10 is an other example of a precaution confirmation screen to be displayed on the display 3 of the image forming apparatus 1 when the fixing unit 15 is replaced in the first embodiment of the present disclosure. The check field 80*c*, which is blank on the precaution confirmation screen 80, is checked, and the check field 80*c* is changed to a checked check field 80*c*-2 on the precaution confirmation screen 80-2. Further, in response to the checked check field 80*c*-2, the next button 80*e*, which is grayed out on the precaution confirmation screen 80, shifts to a normal display state as exemplified by a next button 80*e*-2 on the precaution confirmation screen 80-2, and indicates that the screen is in a selectable state.

Figure 11:
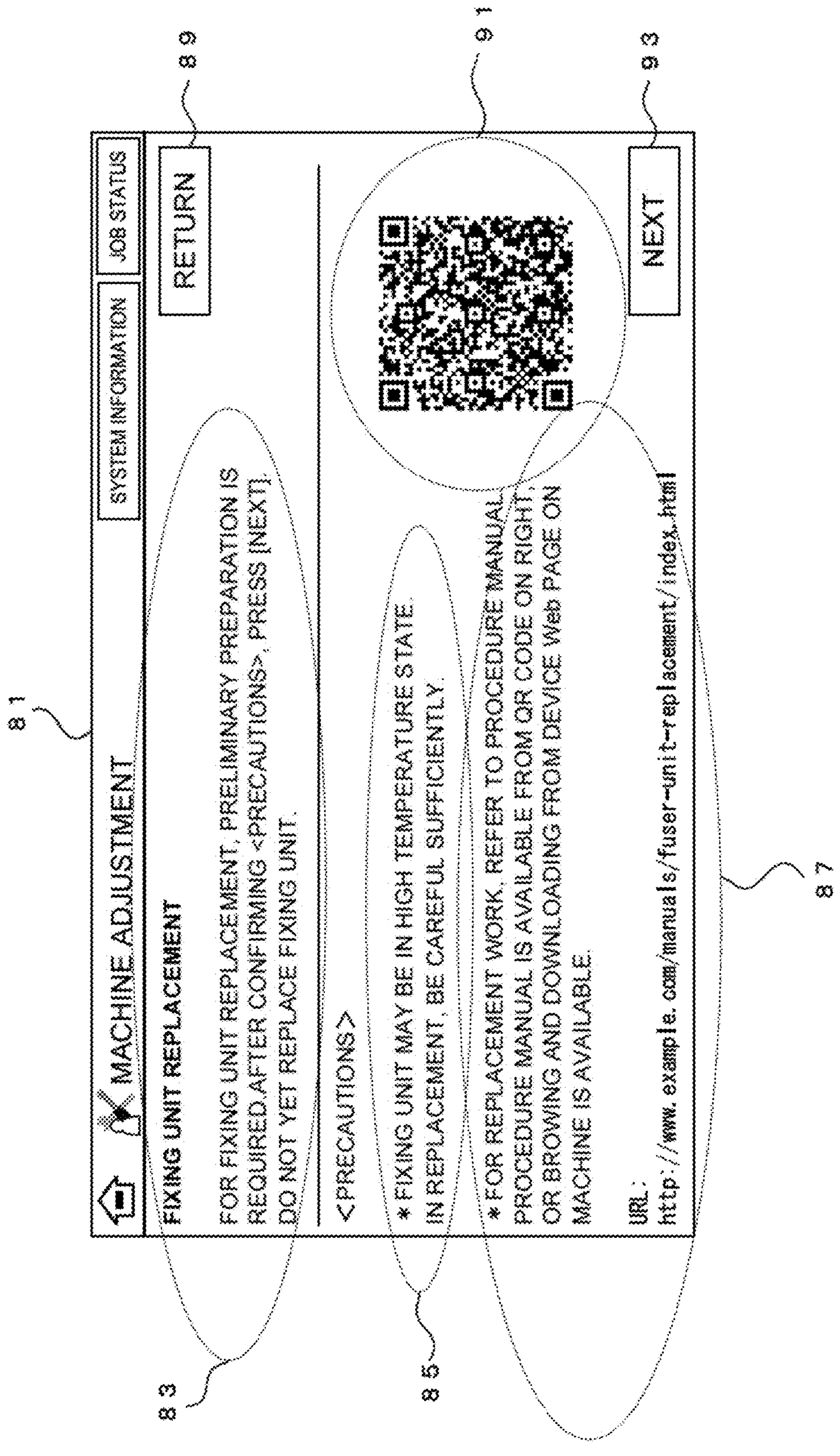
FIG. 11 is a diagram illustrating an example of a replacement preparation start screen to be displayed on the display of the image forming apparatus when the fixing unit is replaced in the first embodiment of the present disclosure.

FIG. 11 is a diagram illustrating an example of a replacement preparation start screen to be displayed on the display 3 of the image forming apparatus 1 when the fixing unit 15 is replaced in the first embodiment of the present disclosure. In step S11, the controller 29 displays a replacement preparation start screen 81 on the display 3. The replacement preparation start screen 81 includes messages 83, 85, and 87, a return button 89, a two-dimensional barcode 91, and a next button 93.

The message 83 is a message for notifying the user that preliminary preparation is necessary before the fixing unit is replaced.

The message 85 is a message for informing the user that the fixing unit is in a high temperature state. In particular, immediately after the image forming apparatus 1 outputs a medium on which an image is formed, a fixing member of the fixing unit 15 is at a high temperature (e.g., 160 to 180 degrees). The message 85 prompts the user not to directly touch the fixing unit 15 in a high-temperature state as described above.

The message 87 notifies the user of information for accessing a procedure manual of replacement work. Address information of data on a procedure manual downloadable by a device other than the image forming apparatus 1 is written in the message 87. Specifically, the device other than the image forming apparatus 1 is, for example, a smartphone, a tablet terminal, a personal computer, or the like (hereinafter, referred to as a user terminal) of the user who performs replacement work of a fixing unit. Performing work while reading the procedure manual on a user terminal allows even a user who does not have knowledge on a fixing device or a replacement procedure to perform the replacement work safely.

Normally, a current state of the image forming apparatus 1, a command with which an instruction or settings are actually enabled for the image forming apparatus 1, various numerical values, and the like are displayed on the display 3 of the image forming apparatus 1. Since a display size of the display 3 is limited, it is difficult to simultaneously display these indications and the procedure manual. There is an idea of switching these indications and display of the procedure manual as necessary. However, in this case, the operation is likely to become cumbersome. Displaying the procedure manual on a user terminal enables to avoid a problem as described above.

Further, as will be described below, replacement work of a fixing unit includes a step of turning on and off the main power of the image forming apparatus 1. Therefore, when the procedure manual is displayed on the display 3 of the image forming apparatus 1, a time during which the procedure manual cannot be confirmed may be generated during the work. However, since the user who reads the message 87 can download the procedure manual to the user terminal, the user can confirm the procedure manual irrespective of an on/off state of the power of the image forming apparatus 1.

In the message 87, a uniform resource locator (URL) on the Internet is written as address information. However, the address information to be written herein is not limited to address information of a resource on the Internet, and may be address information of a resource that can be accessed from the user terminal, and from which data on the procedure manual can be downloaded. For example, in a case where both the user terminal and the image forming apparatus 1 can be connected to the same local area network (LAN), the procedure manual may be stored in the storage 23 of the image forming apparatus 1, and the controller 29 may operate as a file server, and provide data on the procedure manual to the user terminal via the LAN. Further, a Bluetooth communication function may be provided in the communicator 19 and/or the connector 21, and a file may be shared with a user terminal also having the Bluetooth communication function, thereby allowing the user terminal to download the procedure manual data from the image forming apparatus 1 via the Bluetooth communication function.

Note that, in place of displaying the procedure manual on a user terminal, the procedure manual may be displayed on the display 3 of the image forming apparatus 1. In this case, as described above, although the procedure manual cannot be confirmed during a time when the main power of the image forming apparatus 1 is turned on and off, it is not necessary to prepare a user terminal separately.

The two-dimensional barcode 91 is the one in which address information of procedure manual data is displayed as a two-dimensional barcode. The address information indicated by the two-dimensional barcode 91 may be the same address as the address information written in the message 87, or may be an address other than the above.

When the user touches the return button 89, the controller 29 displays, on the display 3, the fixing device type display screen 73. When the user touches the next button 93, the controller 29 proceeds to next step S13.

Figure 12:
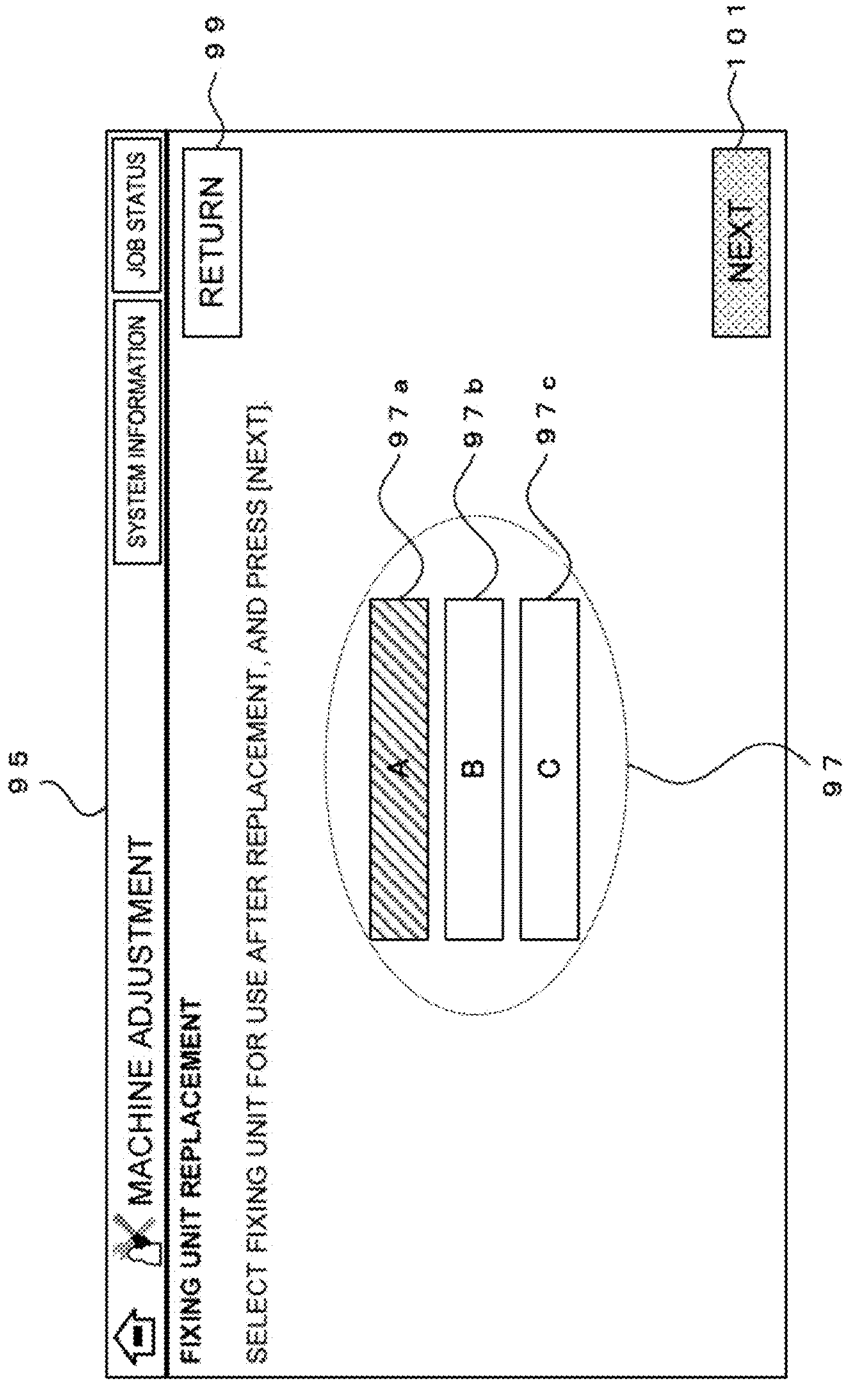
FIG. 12 is a diagram illustrating an example of a fixing device type designation request screen (before designation) to be displayed on the display of the image forming apparatus when the fixing unit is replaced in the first embodiment of the present disclosure.

FIG. 12 is a diagram illustrating an example of a fixing device type designation request screen (before designation) to be displayed on the display 3 of the image forming apparatus 1 when the fixing unit 15 is replaced in the first embodiment of the present disclosure. A fixing device type designation request screen 95 is displayed immediately after the next button 93 of the replacement preparation start screen 81 is pressed in step S11. In step S13, the controller 29 displays the fixing device type designation request screen 95 on the display 3. The fixing device type designation request screen 95 includes a unit type list 97. In the unit type list 97, unit types A97*a*, B97*b*, and C97*c* are displayed. The fixing device type designation request screen 95 includes a return button 99 and a next button 101.

After displaying the fixing device type designation request screen 95, when there is no input from the user, the fixing device type designation request screen 95 is displayed as it is. At this occasion, the unit type A of the currently mounted fixing unit 15 is reflected, and the unit type A97*a* is displayed in a selected state.

In addition, the next button 101 is displayed in a grayed-out manner indicating a state in which it cannot be selected. As described above, the unit type A97*a* associated with the currently mounted fixing unit 15 is selected on the fixing device type designation request screen 95. At this occasion, the controller 29 brings the next button 101 into a state where it cannot be selected (gray-out display). This prevents that the user replaces to a fixing unit of the same unit type as the currently mounted fixing unit by mistake.

Figure 13:
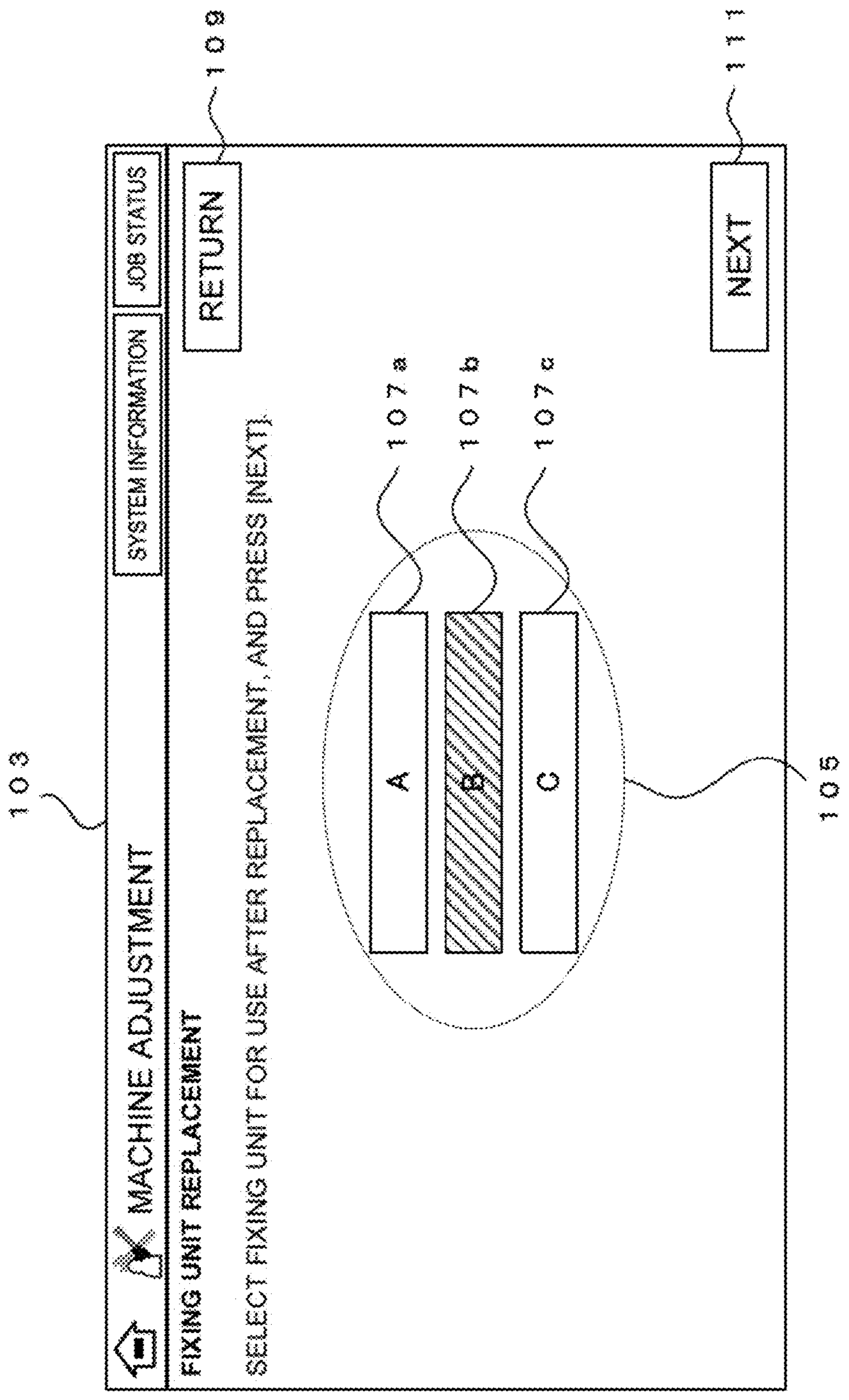
FIG. 13 is a diagram illustrating an example of a fixing device type designation request screen (after designation) to be displayed on the display of the image forming apparatus when the fixing unit is replaced in the first embodiment of the present disclosure.

FIG. 13 is a diagram illustrating an example of a fixing device type designation request screen (after designation) to be displayed on the display 3 of the image forming apparatus 1 when the fixing unit 15 is replaced in the first embodiment of the present disclosure. After the user touches the unit type B97*b* on the fixing device type designation request screen 95, a fixing device type designation request screen 103 is displayed. While the unit type A (unit type A97*a*) is in a selected state on the fixing device type designation request screen 95, a unit type B (unit type B107*b*) is in a selected state on the fixing device type designation request screen 103.

When the unit type in a selected state is changed from the original value (unit type A) as on the fixing device type designation request screen 103, the controller 29 displays a next button 101, which has been grayed out on the fixing device type designation request screen 95, in a selectable state (next button 111) on the display 3.

When the user touches the next button 111 that has become selectable, the controller 29 proceeds to next step S15 by assuming that a unit type in a selected state at this occasion is selected, and performs cooling time display to be described next. Further, at this occasion, the controller 29 updates the unit type stored in the attachment unit type storage 25 to the selected unit type. When the next button 111 is touched on the fixing device type designation request screen 103, the controller 29 updates the unit type stored in the attachment unit type storage 25 to the unit type B.

Requesting the user for an input of a unit type of a fixing unit after replacement, as exemplified on the fixing device type designation request screen 103 enables to prevent that the fixing unit is replaced with a fixing device of another unit type by mistake.

Figure 14:
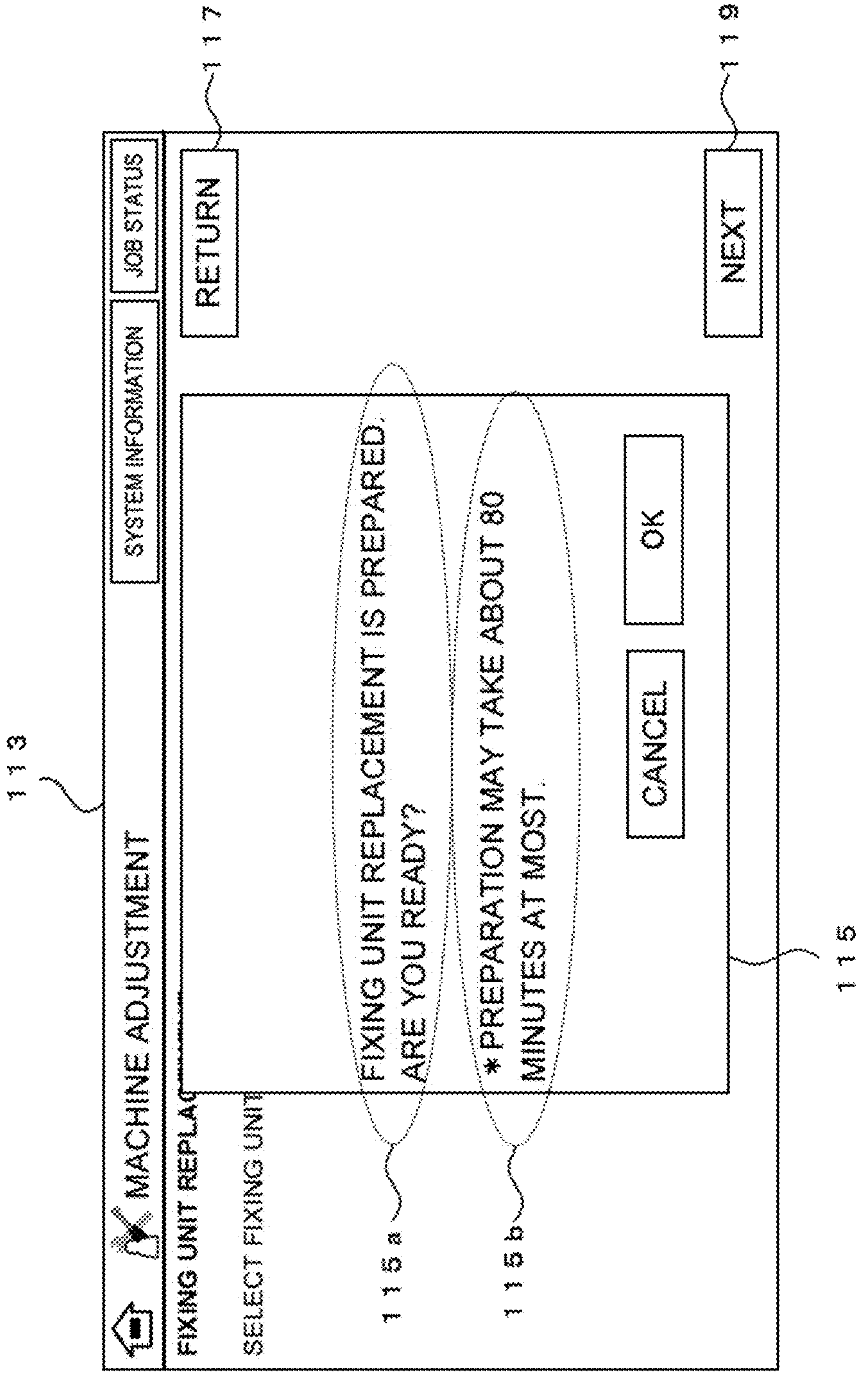
FIG. 14 is a diagram illustrating an example of a cooling time display screen to be displayed on the display of the image forming apparatus when the fixing unit is replaced in the first embodiment of the present disclosure.

FIG. 14 is a diagram illustrating an example of a cooling time display screen to be displayed on the display 3 of the image forming apparatus 1 when the fixing unit 15 is replaced in the first embodiment of the present disclosure. The cooling time display screen 113 includes a message area 115. In the message area 115, a message 115*a* of confirming the user that the image forming apparatus 1 enters preparation for replacing the fixing unit 15 and a message 115*b* of informing the user of an estimated time required for the preparation are displayed.

In the message 115*b*, a maximum expected required time is displayed as "about 80 minutes". The cooling time estimator 31 of the controller 29 calculates the maximum expected required time, based on the current temperature of the fixing unit 15, which is measured by the temperature sensor 17. Thus, the user can know when the replacement work of the fixing unit 15 can be started.

Alternatively, the image forming apparatus 1 may be continuously operated, the fixing unit 15 that has reached a designed upper limit temperature may be left, a time required for the fixing unit 15 to return to a room temperature may be actually measured several times, an expected required time may be calculated based on the statistical value of the actual required time, and the expected required time may be displayed in the message 115*b*. In this case, the temperature sensor 17 and the cooling time estimator 31 may be omitted.

Figure 15:
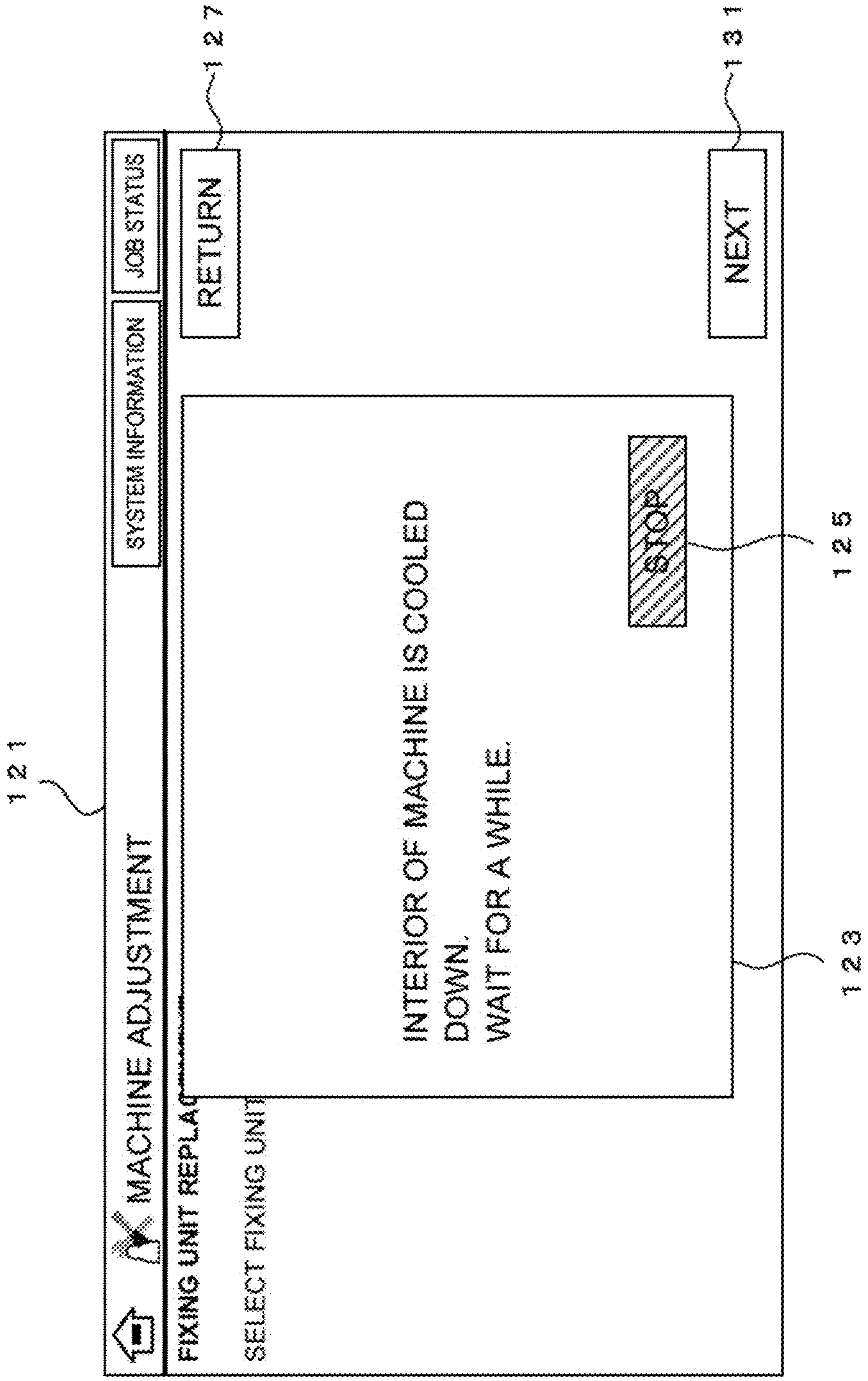
FIG. 15 is a diagram illustrating an example of a cooling-down screen to be displayed on the display of the image forming apparatus when the fixing unit is replaced in the first embodiment of the present disclosure.

FIG. 15 is a diagram illustrating an example of a cooling-down screen to be displayed on the display 3 of the image forming apparatus 1 when the fixing unit 15 is replaced in the first embodiment of the present disclosure. A cooling-down screen 121 includes a message area 123. In the message area 123, a message of informing the user that the process is currently waiting for the temperature of the fixing unit 15 to fall down, and a stop button 125 are displayed.

The controller 29 starts displaying the cooling-down screen 121 (step S17), and causes the temperature monitor 33 to measure the temperature of the fixing unit 15 with the temperature sensor 17 and periodically compare the measured temperature with a predetermined threshold temperature. The threshold temperature may be set to, for example, about 30 to 40° C. on the basis that, for example, a person does not get burned even if the person touches the fixing unit. Alternatively, the temperature may be set to about 20 to 30° C., based on the room temperature. When the stop button 125 is not touched and the temperature of the fixing unit 15 reaches the threshold temperature or lower (YES in step S18), the controller 29 proceeds to step S29.

When the stop button 125 is touched while the cooling-down screen 121 is displayed (YES in step S19), the controller 29 stops the replacement work and proceeds to step S21.

Figure 16:
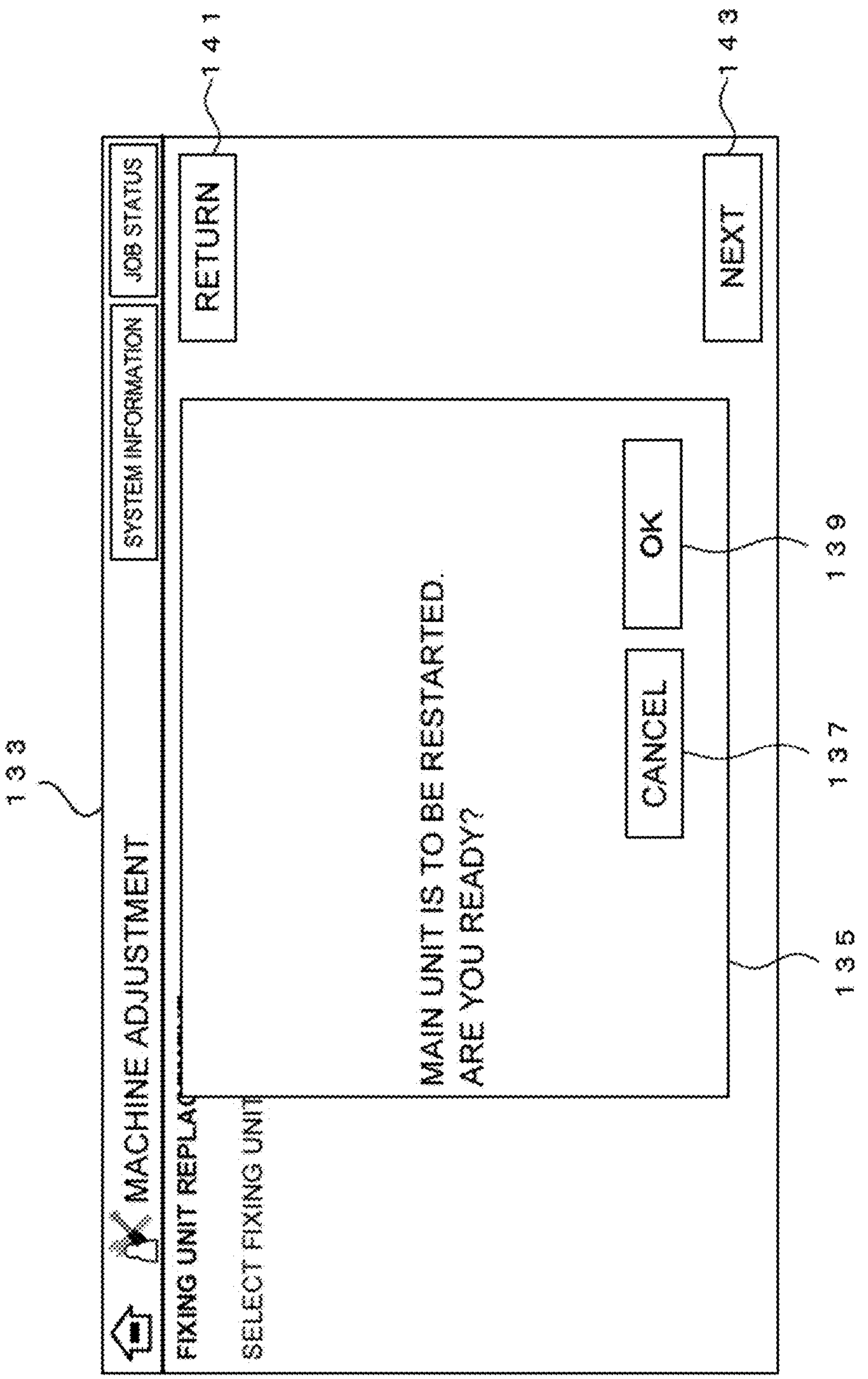
FIG. 16 is a diagram illustrating an example of a restart screen to be displayed on the display of the image forming apparatus when the replacement work of the fixing unit is stopped in the first embodiment of the present disclosure.

FIG. 16 is a diagram illustrating an example of a restart screen to be displayed on the display 3 of the image forming apparatus 1 when the replacement work of the fixing unit 15 is stopped in the first embodiment of the present disclosure. In step S21, the controller 29 displays a restart screen 133 on the display 3. The restart screen 133 includes a message area 135. The message area 135 includes a message of informing the user that the image forming apparatus 1 is to be restarted, a cancel button 137, and an OK button 139.

When the cancel button 137 is touched, the controller 29 displays the cooling-down screen 121 again on the display 3. When the OK button 139 is touched, the controller 29 restarts the image forming apparatus 1 (step S23), and then displays the home screen 51 on the display 3 (step S25).

Figure 17:
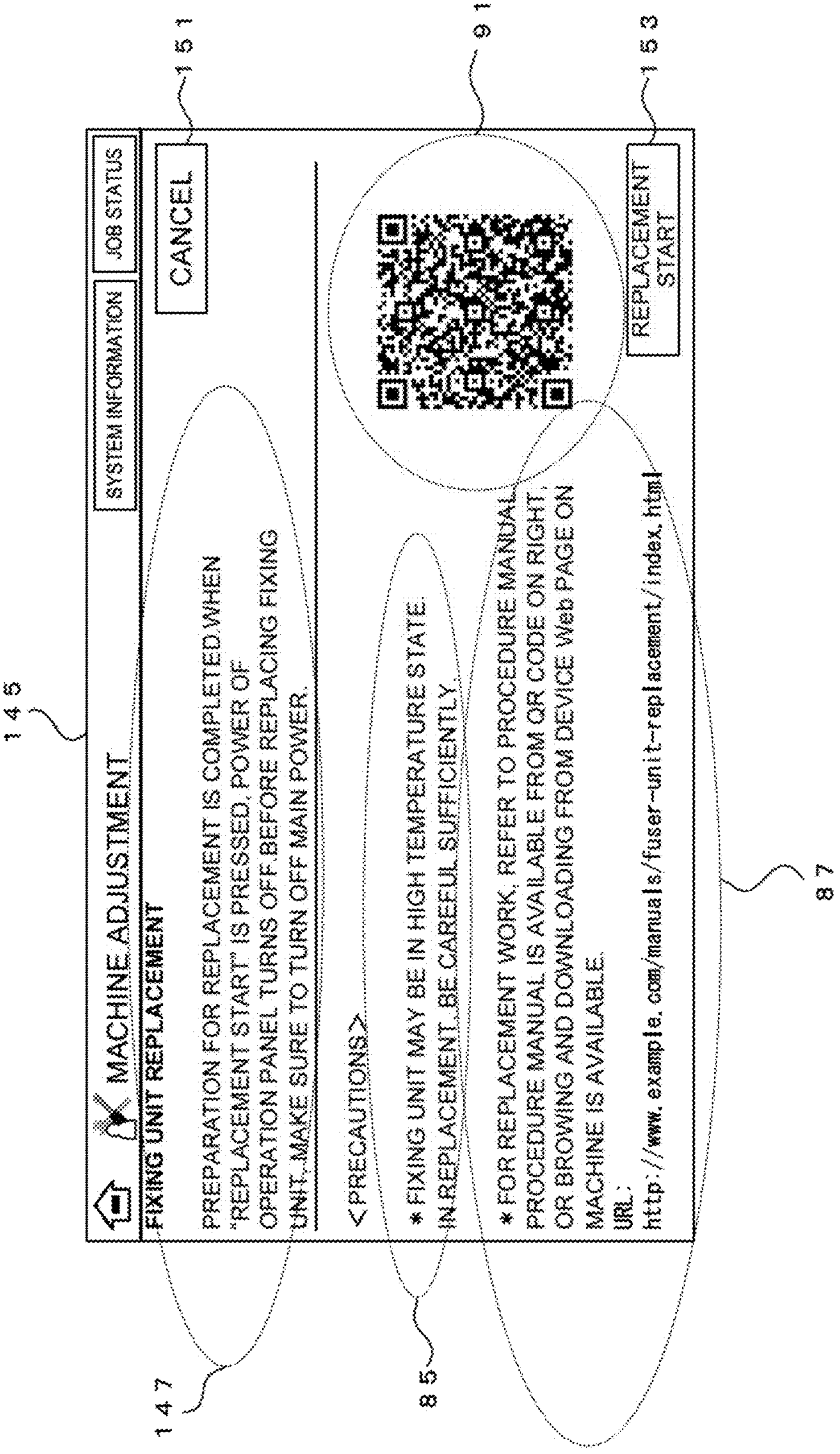
FIG. 17 is a diagram illustrating an example of a preparation completion screen to be displayed on the display of the image forming apparatus when the fixing unit is replaced in the first embodiment of the present disclosure.

FIG. 17 is a diagram illustrating an example of a preparation completion screen to be displayed on the display 3 of the image forming apparatus 1 when the fixing unit 15 is replaced in the first embodiment of the present disclosure. In step S29, the controller 29 displays a preparation completion screen 145. The preparation completion screen 145 includes messages 147, 85, and 87, a cancel button 151, a two-dimensional barcode 91, and a replacement start button 153.

The message 147 includes a message of notifying the user that a temperature of the fixing unit 15 has been lowered to such an extent that the user can touch the fixing unit 15 and the fixing unit 15 is in a state ready for replacement work. The message 147 includes a message of notifying the user that, when the replacement start button 153 is touched, power of an operation panel (the display 3 and the operation acceptor 5) is turned off and the image forming apparatus 1 is shifted to a stand-by state. Further, the message 147 includes a message of instructing the user to turn off the main power switch 7 and to turn off the power of the image forming apparatus 1, after the image forming apparatus 1 is shifted to a stand-by state.

The cancel button 151 is a button for instructing the image forming apparatus 1 to stop replacement of the fixing unit 15. When the cancel button 151 is touched (NO in step S31), the controller 29 proceeds to step S33.

The replacement start button 153 is a button for finally instructing the image forming apparatus 1 to replace the fixing unit 15. Since the messages 85 and 87 and the two-dimensional barcode 91 have already been described with reference to FIG. 11, and a description thereof will be omitted herein.

Figure 18:
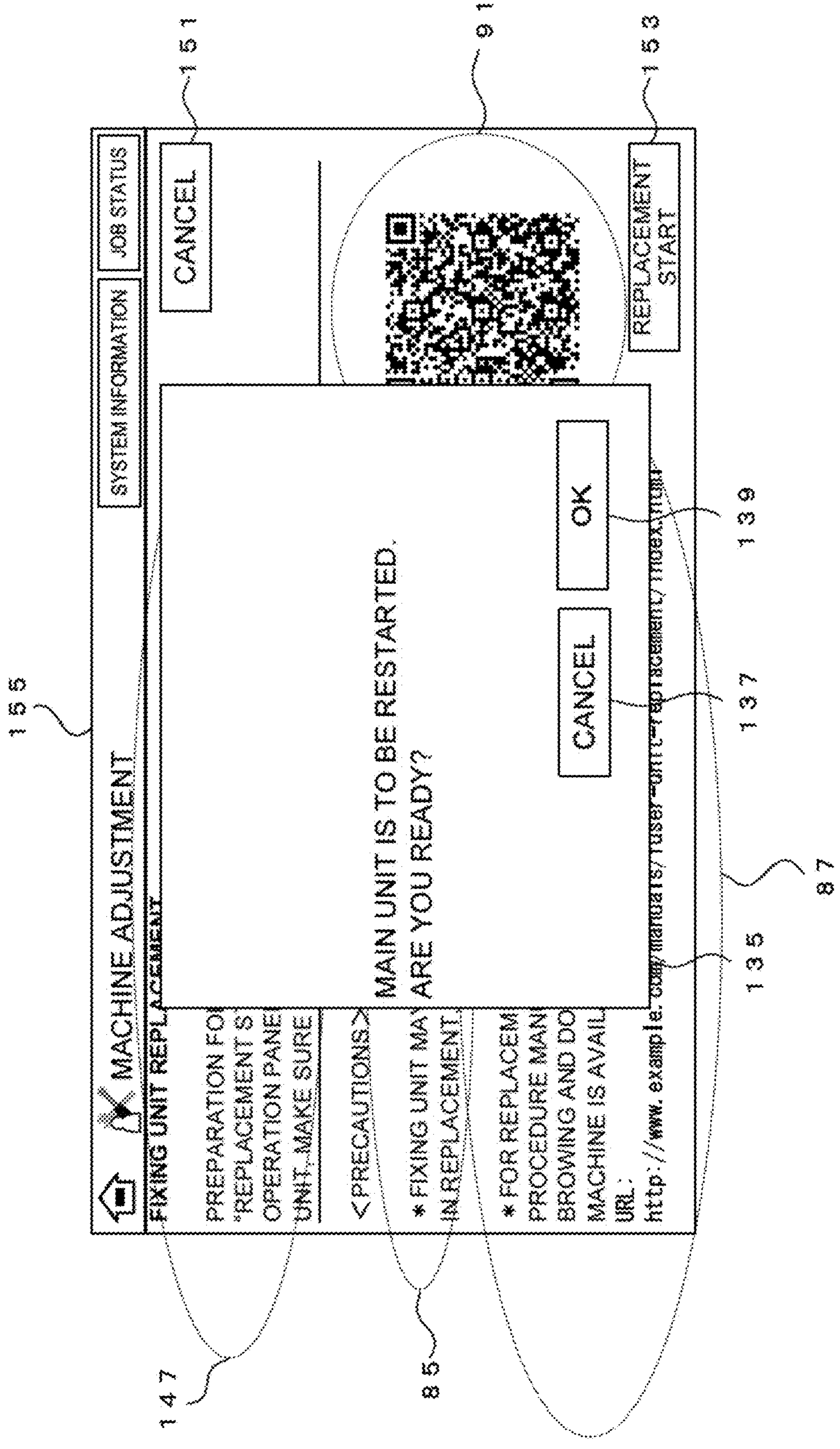
FIG. 18 is a diagram illustrating an example of a restart screen to be displayed on the display of the image forming apparatus when the fixing unit replacement work is stopped in the first embodiment of the present disclosure.

FIG. 18 is a diagram illustrating an example of a restart screen to be displayed on the display 3 of the image forming apparatus 1 when the replacement work of the fixing unit 15 is stopped in the first embodiment of the present disclosure. A restart screen 155 is a screen to be displayed in step S33, and is a screen in which the message area 135 is superimposed and displayed on the preparation completion screen 145 displayed in steps S29 and S31. Since the message area 135 has been described in association with FIG. 16, a description thereof will be omitted here.

Figure 19:
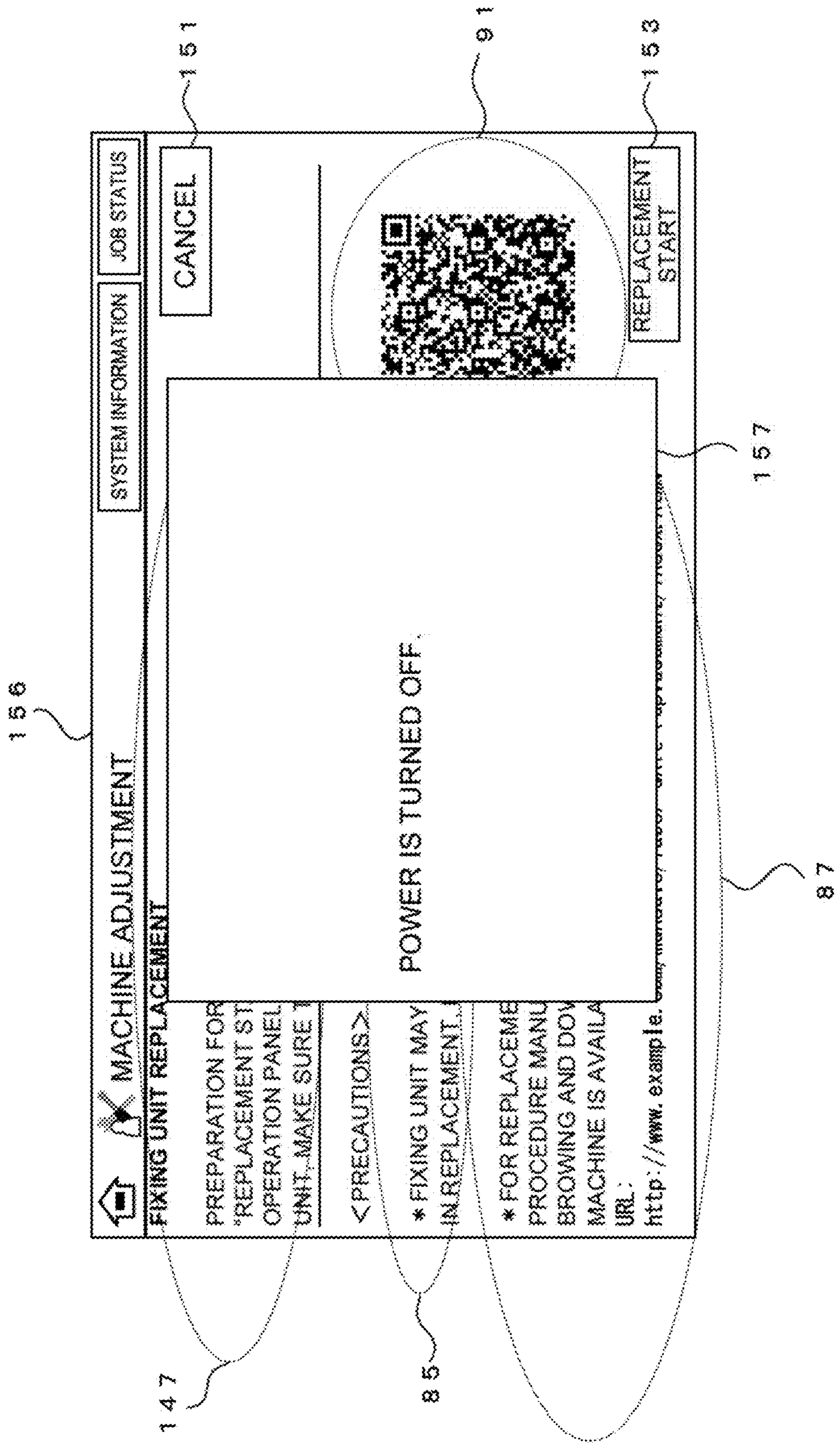
FIG. 19 is a diagram illustrating an example of a power-off screen to be displayed on the display of the image forming apparatus when the fixing unit is replaced in the first embodiment of the present disclosure.

FIG. 19 is a diagram illustrating an example of a power-off screen to be displayed on the display 3 of the image forming apparatus 1 when the fixing unit 15 is replaced in the first embodiment of the present disclosure. In step S39, the controller 29 displays a power-off screen 156 on the display 3. The power-off screen 156 is displayed by superimposing a message area 157 on the preparation completion screen 145. The message area 157 displays a message of informing the user that the power of the operation panel (the display 3 and the operation acceptor 5) is turned off and the operation panel is shifted to a stand-by state. The message area 157 may further display a message of instructing the user to turn off the main power of the image forming apparatus 1 by operating the main power SW7 after the display 3 is turned off, and to turn on the main power of the image forming apparatus 1 by operating the main power SW7 after the replacement work for replacing the fixing unit with a fixing unit of a unit type designated in step S13 is executed.

Based on the unit type of the fixing unit 15 after replacement, which is designated by the user in step S13, the controller 29 reads setting information of the image forming apparatus 1 determined for the unit type from the unit-type-based setting information storage 27 and updates relevant setting information.

After displaying the power-off screen 156, after the image forming apparatus 1 is shifted to the stand-by state, the controller 29 turns off the main power of the image forming apparatus 1, based on the operation of the main power SW7 by the user (step S43). Next, the user replaces the currently mounted fixing unit 15 with a fixing unit of the unit type designated in step S7 (step S45). After the replacement of the fixing unit, the main power of the image forming apparatus 1 is turned on, based on the operation of the main power SW7 by the user (step S47). When the main power is turned on, the controller 29 displays the home screen 51 on the display 3 (step S49).

1.4 Advantageous Effect of First Embodiment

The following advantageous effects are provided according to the first embodiment.

In step S9, since the fixing device type display screen 73 is displayed, the user can confirm the unit type of the currently mounted fixing unit 15 before replacement.

In step S13, since the fixing device type designation request screen 103 is displayed and the user is requested to input a unit type, it is possible to prompt the user to securely recognize the unit type after the replacement. Thus, it is possible to prevent the fixing unit 15 from being replaced with a fixing unit of a wrong unit type. Thus, it is possible to prevent the fixing unit 15 from being replaced with a fixing unit of a wrong unit type.

In step S13, the unit type of the currently mounted fixing unit 15 is compared with the unit type after replacement, and when the two match, the next button 101 is grayed out and made unselectable, thereby preventing a situation in which the unit type does not change before and after replacement.

In step S11, since information for accessing a procedure manual of replacement work is notified to the user, as the message 87 on the replacement preparation start screen 81, the user can perform the replacement work of the fixing unit 15 while viewing a user terminal. Therefore, even a user who lacks knowledge about a structure of the image forming apparatus 1, or details on the replacement work of the fixing unit 15 can safely perform the replacement work. Further, since the procedure manual can be browsed on the user terminal, the user can browse the procedure manual irrespective of on/off of the power of the image forming apparatus 1.

In step S15, the maximum expected time required for cooling the fixing unit 15 may be displayed. In this way, even when the user once leaves the image forming apparatus 1, the user can execute the replacement work of the fixing unit 15 without a loss of time if the user returns to the image forming apparatus 1 after the elapse of the maximum expected required time.

1.5 Modification of First Embodiment

1.5.1 Modification 1

In step S11, the replacement preparation start screen is displayed, and the procedure manual of the replacement work can be displayed on the user terminal. However, instead of executing step S11, or while executing step S11, the controller 29 may display the procedure manual on the display 3 as follows. Namely, the controller 29 may display the procedure manual on the display 3 at a timing immediately before the user performs the replacement work after completion of the replacement preparation, specifically, after selecting "Yes" (execute replacement) in step S31 and before being shifted to a stand-by state in step S41.

In this case, the user cannot confirm the procedure manual in the middle of the replacement work of step S45, but can confirm the work content immediately before the replacement work.

1.5.2 Modification 2

In step S11, the replacement preparation start screen is displayed, and the procedure manual of the replacement work can be displayed on the user terminal. However, instead of executing step S11 or while executing step S11, the controller 29 may cause the image former 13 to print the procedure manual or a part of the procedure manual. In this case, data of the procedure manual or a part of the procedure manual are stored in the storage 23 in advance. The printing of the procedure manual may be performed at any timing before shifting to a stand-by state in step S41. For example, the printing may be performed when the replacement preparation start screen is displayed in step S11.

2. Second Embodiment

Figure 20:
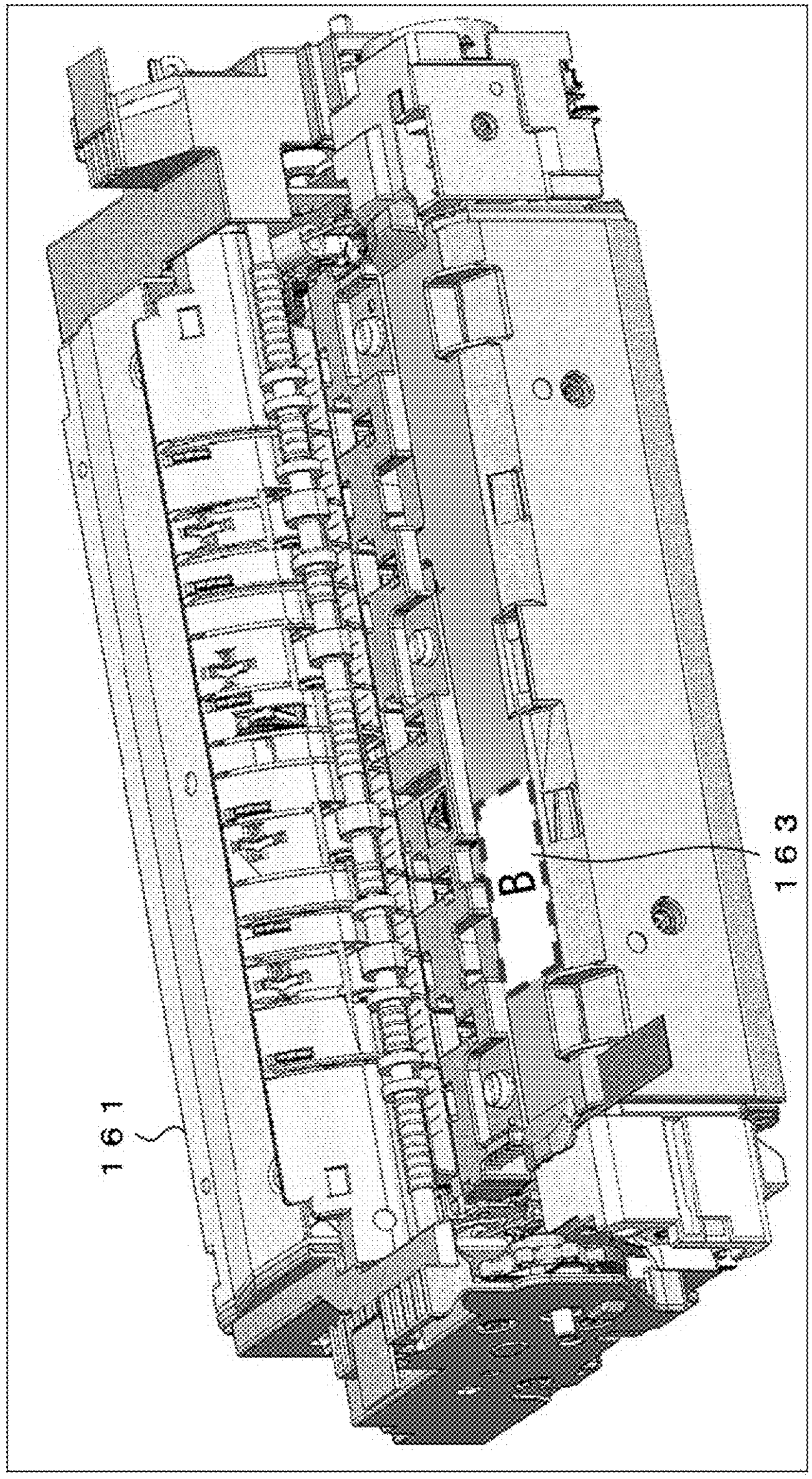
FIG. 20 is a perspective view of a fixing unit used in an image forming apparatus according to a second embodiment of the present disclosure.

In a second embodiment, an image forming apparatus 1 having the same functional configuration as that of the first embodiment is used. However, a fixing unit 161 in FIG. 20 is used instead of the fixing unit 15. An operation is performed in accordance with flowcharts of FIGS. 21 and 22, instead of the flowcharts of FIGS. 2 and 3.

Figure 21:
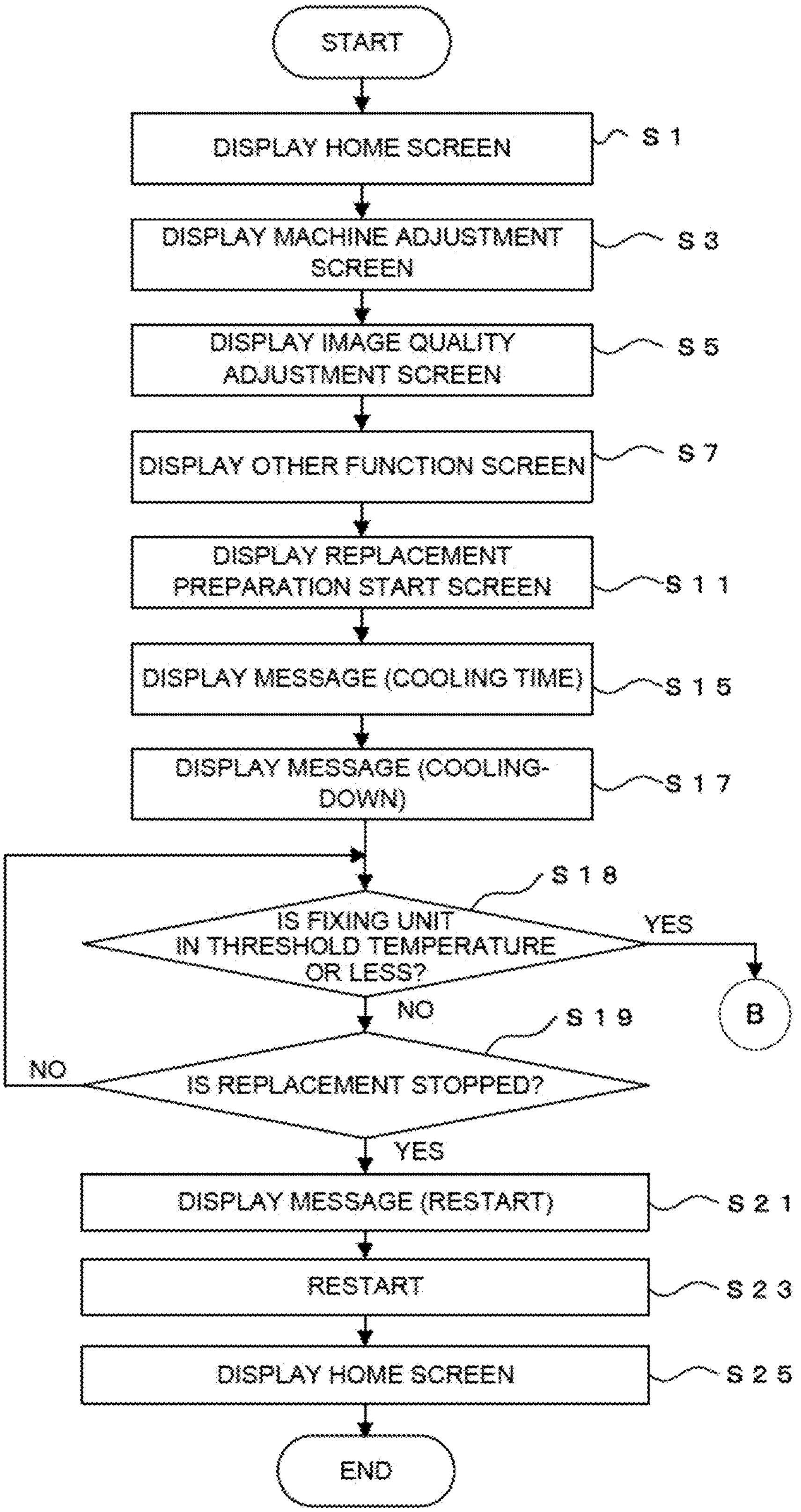
FIG. 21 is a flowchart for describing a replacement work of the fixing unit in the image forming apparatus according to a second embodiment of the present disclosure.
Figure 22:
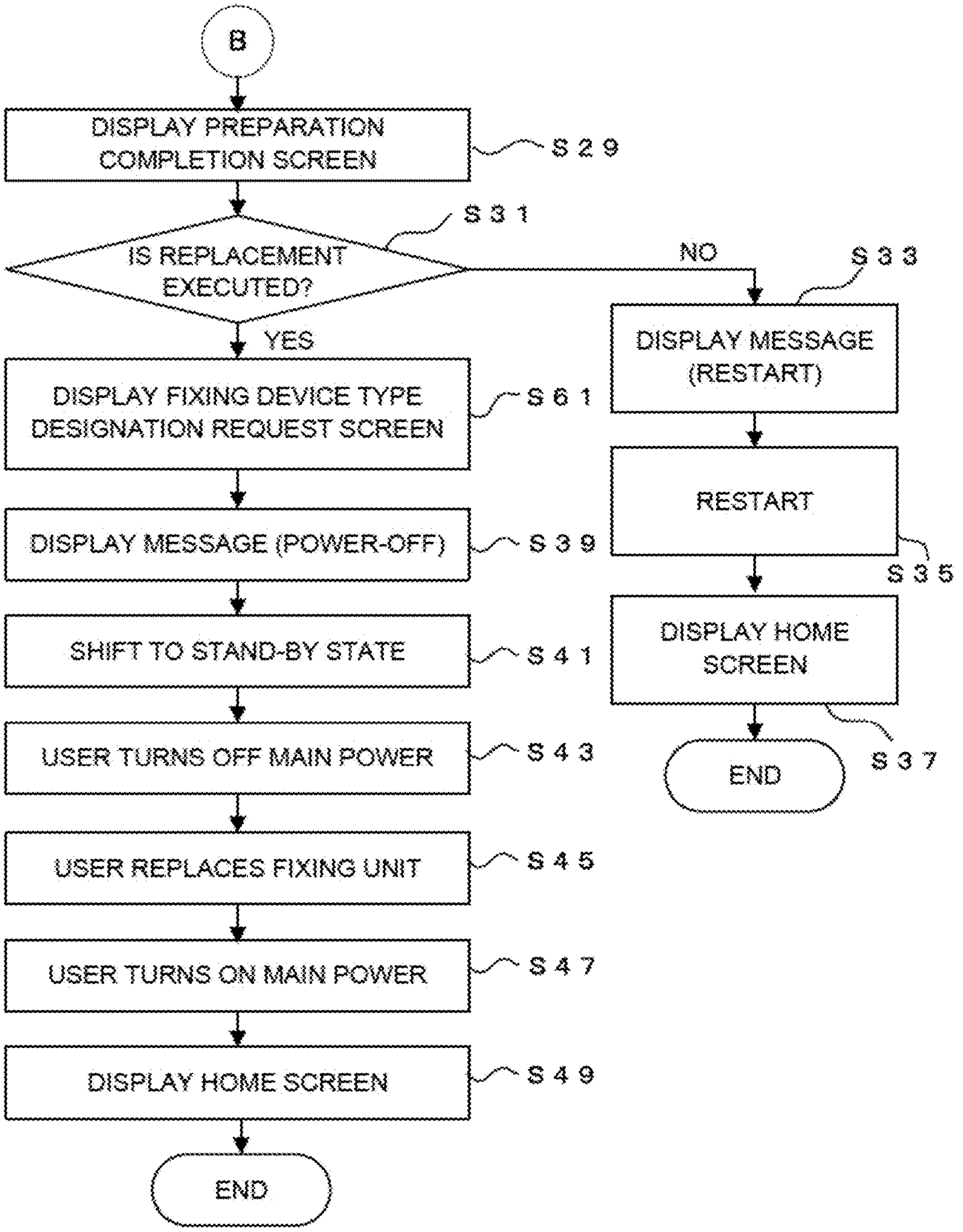
FIG. 22 is a flowchart for describing the replacement work of the fixing unit in the image forming apparatus according to the second embodiment of the present disclosure.

As compared with the flowcharts of FIGS. 2 and 3, the flowcharts of FIGS. 21 and 22 are different in the following points.

- In FIGS. 21 and 22, there is no step S9 of displaying the fixing device type display screen 73.
- The step of executing the fixing device type designation request screen 95, 103 is step S13 in FIG. 2 in the first embodiment, whereas it is step S61 in FIG. 22 in the second embodiment.
- There is no step S10 of displaying the precaution confirmation screen.

Hereinafter, a difference between step S9 and step S61 will be mainly described, and the description of the same matters as in the first embodiment will be omitted. Step S10 is simply a functional omission.

2.1 Fixing Unit 161

The fixing unit 161 includes a unit type display 163. The unit type display 163 is a display of a unit type of the fixing unit 161. The unit type display 163 is provided in an area (non-sheet passing area) of the fixing unit 161 other than an area (sheet passing area) through which a medium to be transported for fixing an image passes when the fixing unit 161 is mounted to the image forming apparatus 1. The indication form is not particularly limited. For example, the unit type may be directly written in ink or the like on the surface of a housing of the fixing unit 161 in the non-sheet passing area. Alternatively, a seal on which the unit type is written may be stuck to the non-sheet passing area on the surface of the housing and provide the unit type display 163. The unit type to be written in the unit type display 163 may be optionally determined by the user.

2.2 Operation of Second Embodiment

When a fixing unit replacement button 69 is touched on an other function screen 67 displayed in step S7, a controller 29 displays a replacement preparation start screen 81 on a display 3 (step S11).

When a preparation completion screen 145 is displayed in step S29 and the replacement start button 153 is touched (YES in step S31), the controller 29 displays a fixing device type designation request screen 95 (step S61).

The fixing device type designation request screen 95 is in a state immediately after the transition from step S31, and a unit type A of the fixing unit 15 that is currently mounted is reflected, whereby a unit type A97*a* is displayed in a selected state. Therefore, a next button 101 is displayed in a non-selectable state such as gray-out.

When the user selects a unit type B as a unit type after replacement, a fixing device type designation request screen 103 is displayed. Herein, a next button 111 is displayed in a selectable state. When the fixing device type designation request screen 103 is displayed, the user preferably confirms the unit type of the fixing unit 161 by visually checking the unit type display 163 of the fixing unit 161.

When the next button 111 is touched, the controller 29 proceeds to step S39 and displays a power-off screen 156 on the display 3 (step S61).

According to the second embodiment, since step S9 in the first embodiment is omitted, the fixing device type display screen 73 is not displayed. However, in step S61, when the fixing device type designation request screen 95 is displayed, the unit type A97*a* is displayed in a selected state by reflecting the unit type A of the currently mounted fixing unit 15. Therefore, the user can confirm the unit type of the currently mounted fixing unit 15 by viewing the display of the fixing device type designation request screen 95.

In the first embodiment, a minimum of nine steps are required from step S13 of designating the fixing device type to step S45 of actually performing the replacement operation. For this reason, there is a possibility that the user forgets the fixing device type designated by himself/herself and replaces to a fixing unit 15 of a wrong unit type. On the other hand, in the second embodiment, four steps are required from step S61 of designating the fixing device type to step S45 of actually performing the replacement operation. As described above, in the second embodiment, a time required from the designation of the fixing device type to the replacement operation is short. For this reason, in the second embodiment, erroneous mounting such as replacement of the fixing unit with a fixing unit of a unit type different from the unit type designated by the user himself/herself is less likely to occur.

When the fixing device type designation request screen 103 is displayed, the user can confirm the unit type by visually checking the unit type display 163 of the fixing unit 161. Therefore, since the user can perform the replacement work while visually confirming the unit type of the fixing unit 161, it is possible to prevent a fixing unit different from the unit type designated on the fixing device type designation request screen 103 from being erroneously mounted.

3. Third Embodiment

Figure 23:
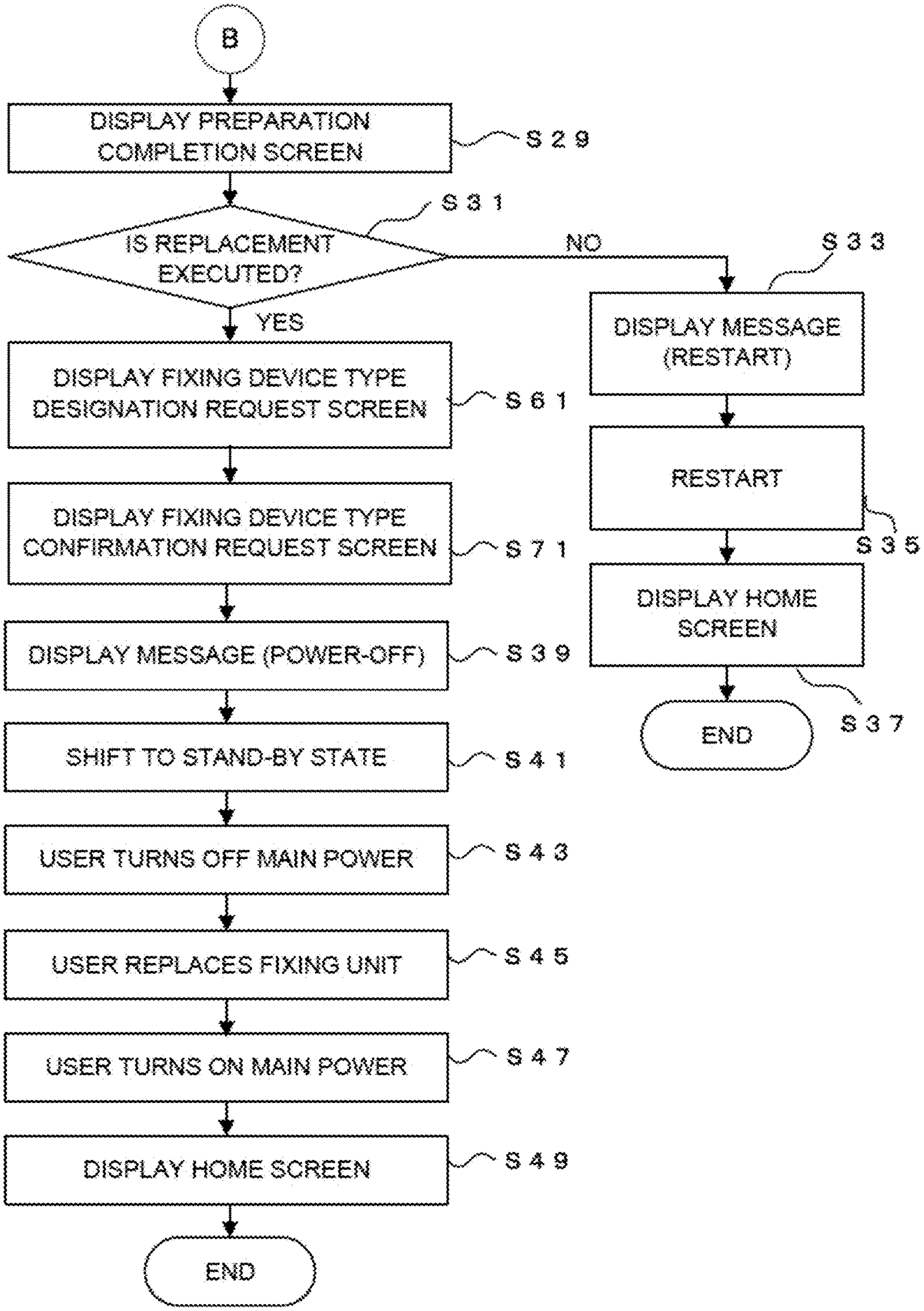
FIG. 23 is a flowchart for describing a replacement work of a fixing unit in an image forming apparatus according to a third embodiment of the present disclosure.

In this embodiment, as in the second embodiment, the fixing unit 161 of FIG. 20 is used instead of the fixing unit 15 in the image forming apparatus 1 of FIG. 1. The operation is in accordance with the flowchart of FIG. 21 and the flowchart of FIG. 23 in the second embodiment. To be more specific, the flowchart of FIG. 23 is different from the flowchart of FIG. 22 in the second embodiment in that the flowchart of FIG. 23 includes step S71. Differences from the second embodiment will be mainly described below with reference to FIG. 23.

In step S61, when the user selects B as a unit type of the fixing unit after replacement in a state in which a fixing device type designation request screen 95 is displayed, a fixing device type designation request screen 103 is displayed, and the unit type B107*b* is selected. In this state, when a next button 111 is touched, the controller 29 displays a fixing device type confirmation request screen 171 on a display 3 (step S71).

Figure 24:
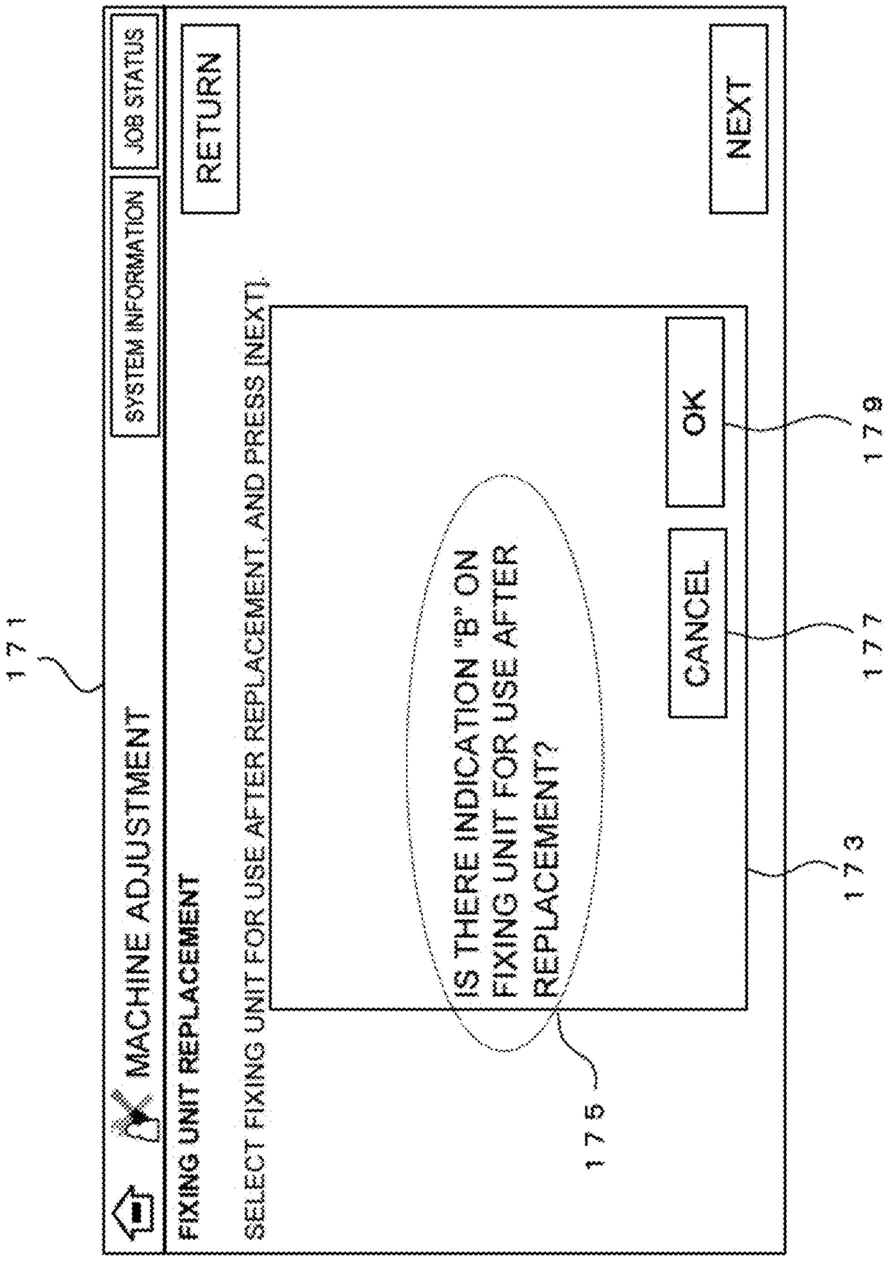
FIG. 24 is a diagram illustrating an example of a fixing device type confirmation request screen to be displayed on a display of the image forming apparatus when a fixing unit is replaced in the third embodiment of the present disclosure.

FIG. 24 illustrates an example of the fixing device type confirmation request screen 171. The fixing device type confirmation request screen 171 is displayed by superimposing a message area 173 on the fixing device type designation request screen 103 of FIG. 13. In the message area 173, a message 175 of prompting the user to confirm a unit type that is written in a unit type display 163 of the fixing unit 161 to be used after replacement is written. The message area 173 also includes a cancel button 177 and an OK button 179.

The unit type displayed in the message 175 is determined according to the unit type designated in step S61. The controller 29 displays the unit type to be designated in step S61 as a unit type to be confirmed in the message 175. In the fixing device type confirmation request screen 171 illustrated in FIG. 24, "B" is written as the unit type in the message 175 because it is assumed that the user has selected a unit type B in step S61.

The message 175 can prompt the user who performs replacement work to confirm whether the unit type of the fixing unit 161 to be used after the replacement is intended by the user.

This can prevent erroneous mounting of a fixing device different from setting of the type of the fixing device to be replaced. Further, by displaying the fixing device type confirmation request screen 171, it is possible to prompt the user to prepare a fixing device to be replaced at hand before the replacement work. Thus, the user can quickly start the replacement work after the main power is turned off. As a result, in comparison with a case where the user is not prompted to prepare the fixing device to be replaced at hand before the replacement work, it is possible to prevent the fixing device of a wrong unit type from being erroneously mounted.

4. Fourth Embodiment

Figure 25:
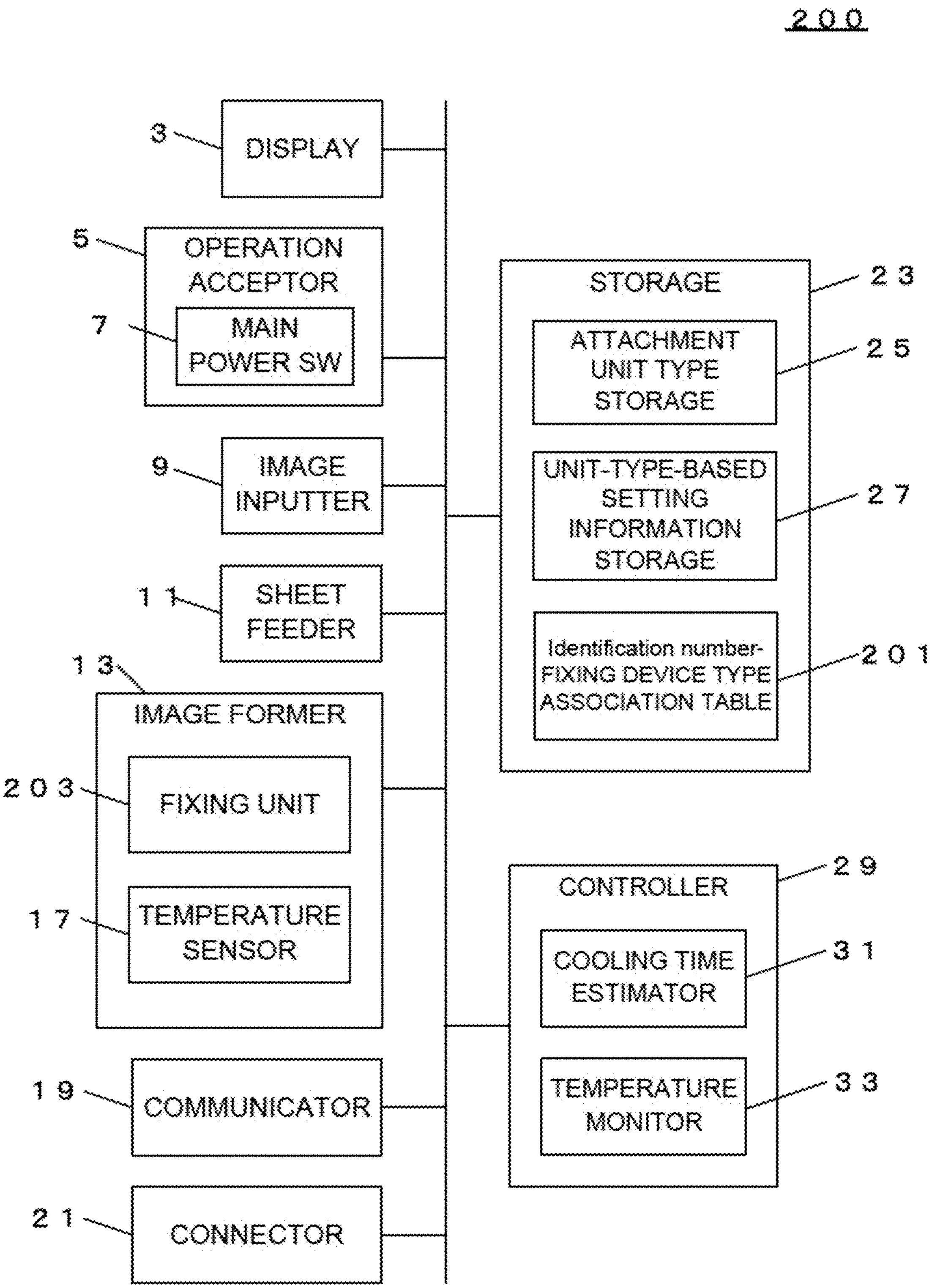
FIG. 25 is a functional block diagram of an image forming apparatus according to a fourth embodiment of the present disclosure.

FIG. 25 is a functional block diagram of an image forming apparatus 200 according to a fourth embodiment of the present disclosure. The image forming apparatus 200 includes an identification number-fixing device type association table 201, in addition to the functional configuration of the image forming apparatus 1 described above. Further, a fixing unit 203 is provided instead of the fixing unit 15. The identification number-fixing device type association table 201 is a table that stores an association relation between an identification number (identification information) of the fixing unit 203 and the unit type of the fixing device.

Figure 26:
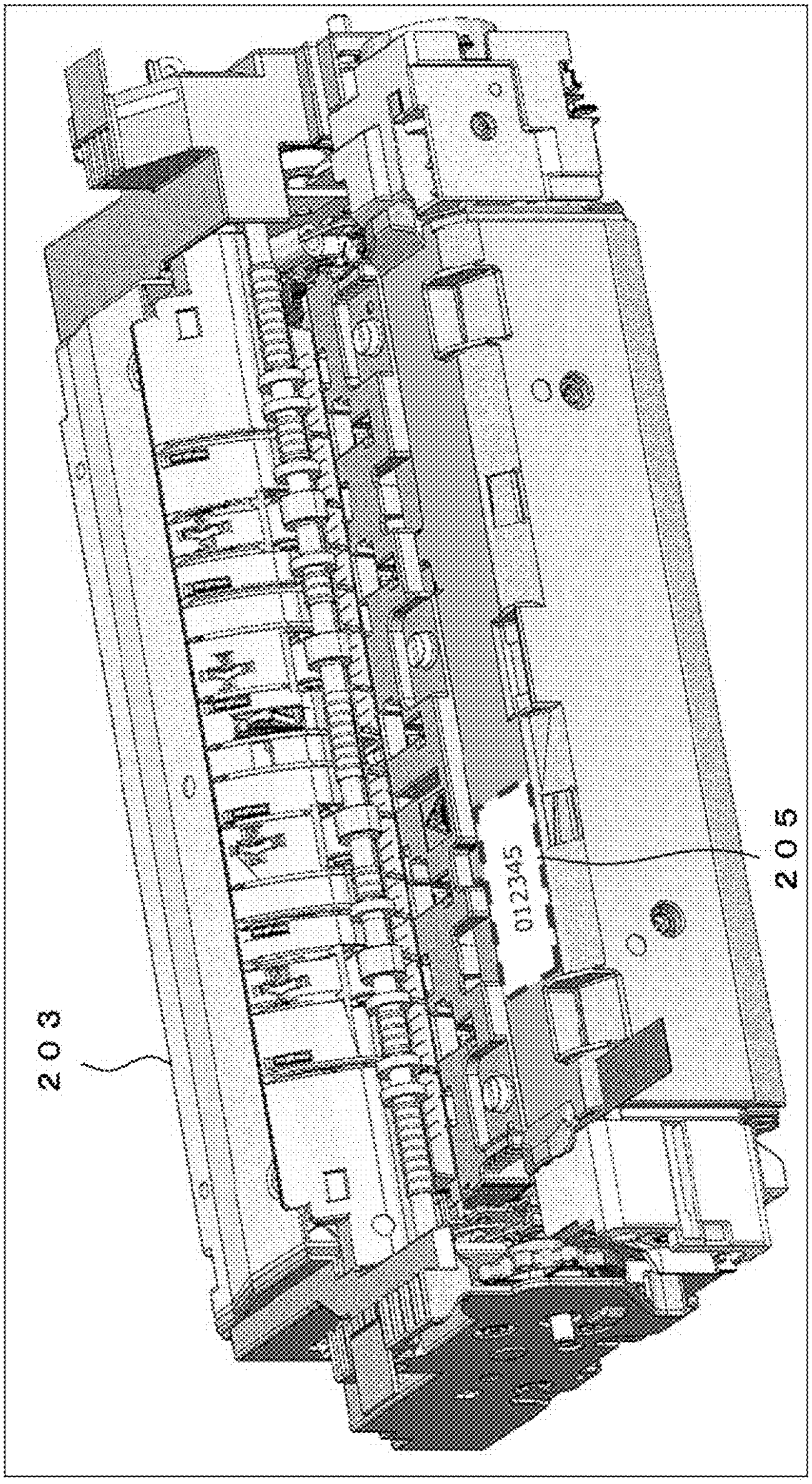
FIG. 26 is a perspective view of a fixing unit used in the image forming apparatus according to the fourth embodiment of the present disclosure.

FIG. 26 is a perspective view of a fixing unit 203 to be used in the image forming apparatus 200. The fixing unit 203 has an identification number display 205. The identification number display 205 is associated with the unit type display 163 of the second and third embodiments.

While the unit type of the fixing unit 161 is displayed in the unit type display 163, the identification number of the fixing unit 203 is displayed in the identification number display 205. The identification number may be assigned at a time of factory shipment of the fixing unit 203 and may be displayed as the identification number display 205 at the time of factory shipment. Alternatively, the identification number may be optionally determined by the user, similarly to the unit type display 163. Similarly to the unit type display 163, the identification number display 205 is provided in the non-sheet passing area of the fixing unit 203.

Figure 27:
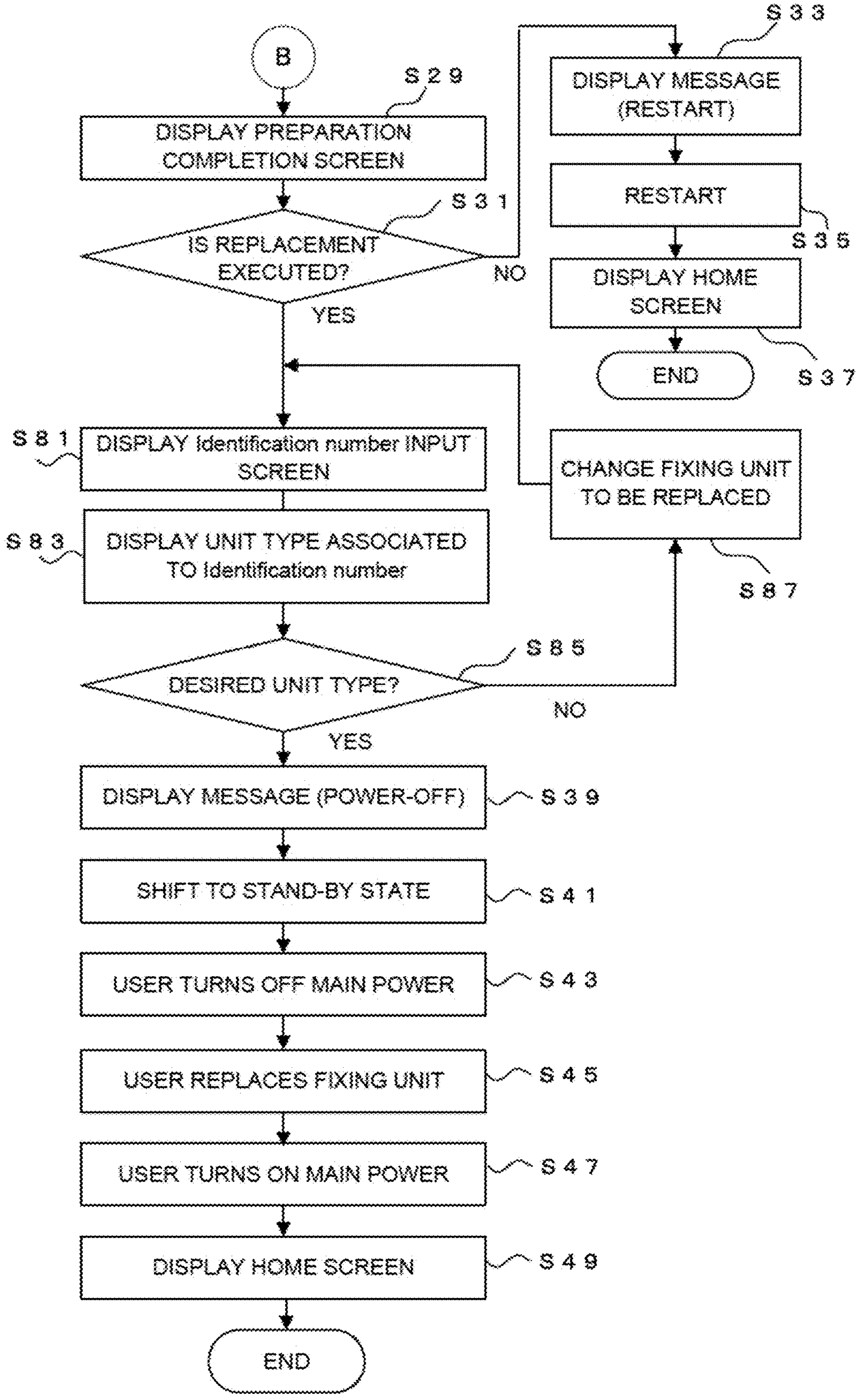
FIG. 27 is a flowchart for describing a replacement work of a fixing unit in the image forming apparatus according to the fourth embodiment of the present disclosure.

FIG. 27 is a flowchart for describing replacement work of the fixing unit 203 in the image forming apparatus 200. The image forming apparatus 200 operates according to the flowcharts of FIGS. 21 and 27. Therefore, each step of FIG. 21 is the same as that of the second embodiment. On the other hand, the flowchart of FIG. 27 in the fourth embodiment is different from the flowchart of FIG. 22 in the second embodiment in that the flowchart of FIG. 27 does not include step S61 but includes steps S81, S83, S85, and S87 instead.

When a replacement start button 153 is touched in step S31 on the preparation completion screen 145 displayed in step S29 (YES in step S31), the controller 29 displays an identification number input screen on a display 3 (step S81).

Figure 28:
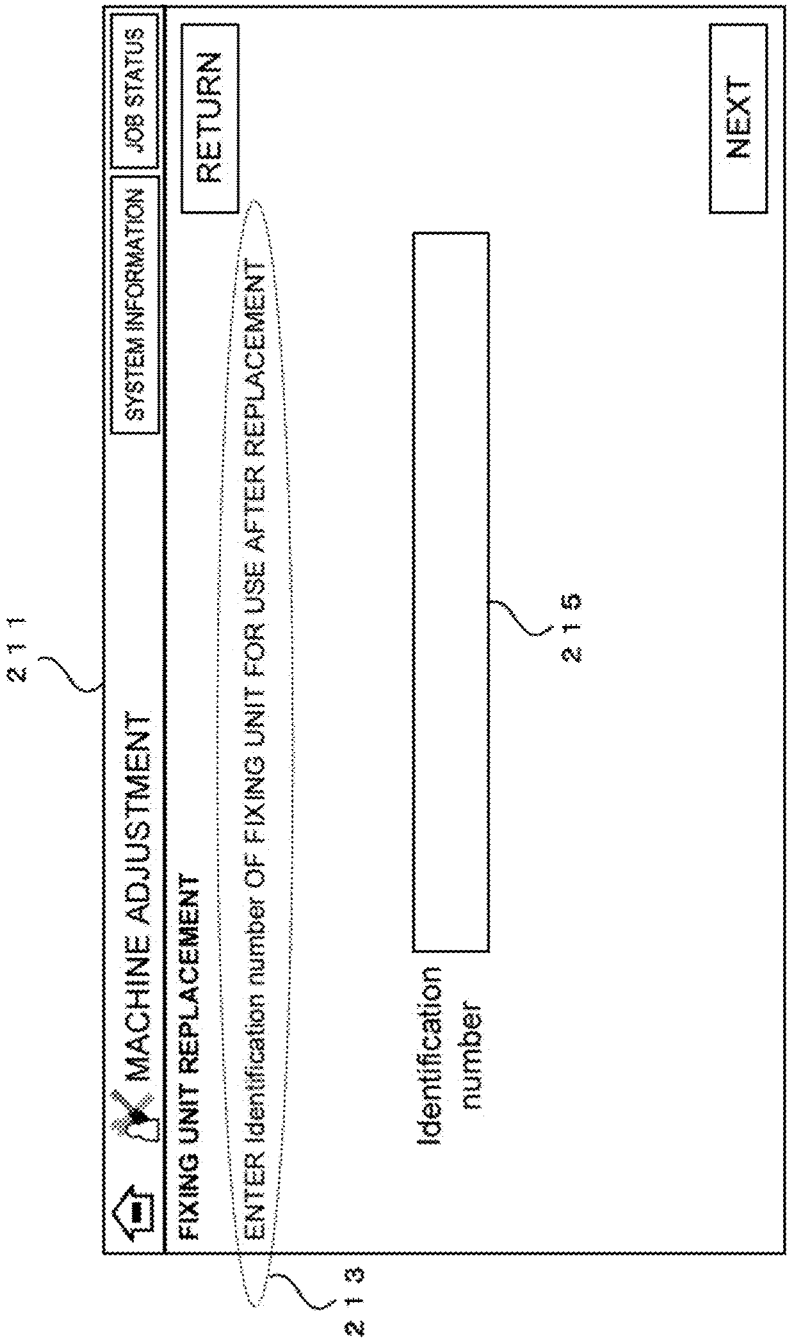
FIG. 28 is a diagram illustrating an example of an identification number input screen to be displayed on a display of the image forming apparatus when the fixing unit is replaced in the fourth embodiment of the present disclosure.
Figure 29A:
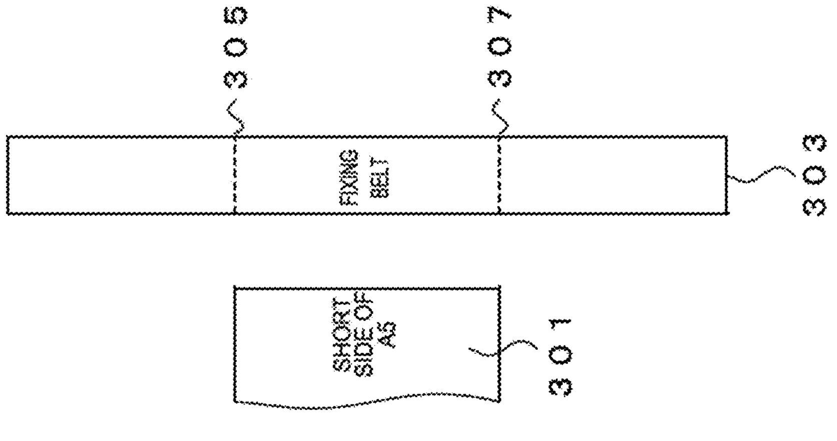
FIG. 29A is a diagram for describing scratches generated on a fixing belt when an A5 sheet passes.
Figure 29B:
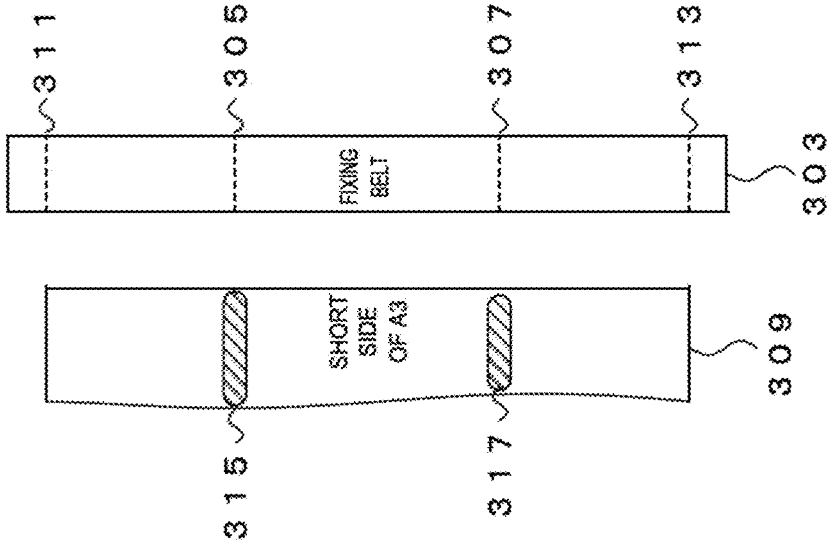
FIG. 29B is a diagram for describing stains generated on an A3 sheet when the sheet passes on the fixing belt having scratches.
Figure 30B:
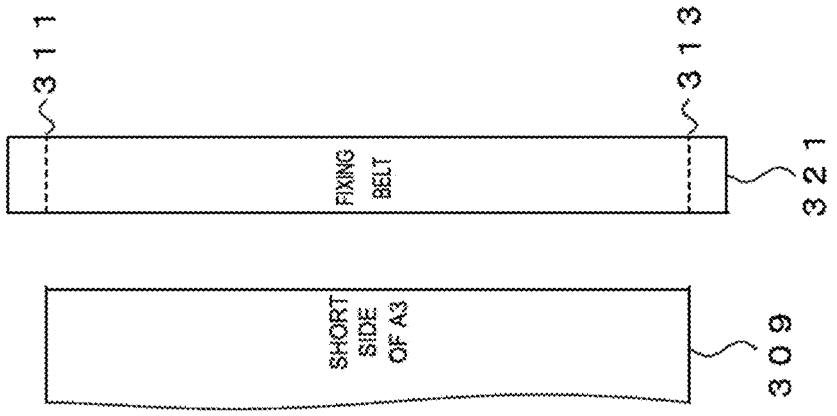
FIG. 30B is a diagram for describing scratches generated on a fixing belt for an A3 sheet when the A3 sheet passes.
Figure 30A:
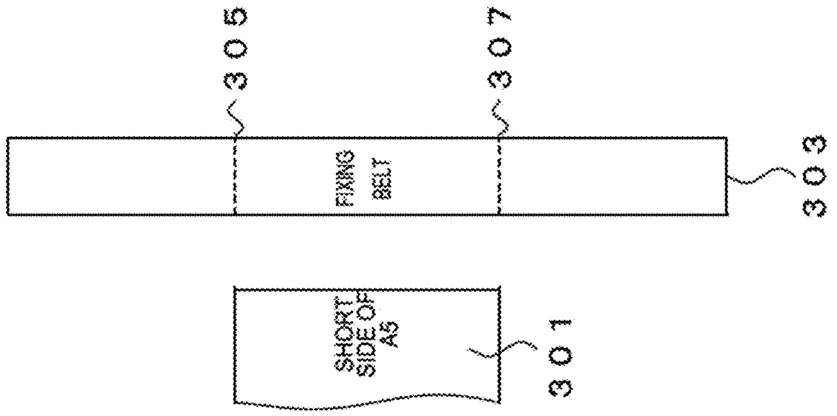
FIG. 30A is a diagram for describing scratches generated on a fixing belt for an A5 sheet when the A5 sheet passes.

FIG. 28 is a diagram illustrating an identification number input screen 211 which is an example of an identification number input screen to be displayed on the display 3 of the image forming apparatus 200 when the fixing unit 203 is replaced in the fourth embodiment. The identification number input screen 211 includes a message 213 and an input field 215. The message 213 is a message of requesting the user to input an identification number of the fixing unit to be used after replacement. The input field 215 is an input field for inputting the identification number of the fixing unit to be used after replacement.

When the identification number of the fixing unit 203 to be used after replacement is input via an operation acceptor 5, the controller 29 acquires a unit type of the fixing unit 203 having the input identification number, based on the identification number-fixing device type association table 201, and displays the unit type on the display 3 (step S83).

The user views the displayed unit type and determines whether the unit type is a desired unit type. In a case where the fixing unit 203 having the identification number is not a desired unit type, when the user inputs the fact via the operation acceptor 5 (NO in step S85), the controller 29 displays a message of prompting the user to change the fixing unit 203 to be replaced with another one on the display 3 (Step S87).

On the other hand, in a case where the fixing unit 203 having the identification number is a desired unit type, when the user inputs the fact via the operation acceptor 5 (YES in step S85), the processing proceeds to step S39, and a power-off screen 156 is displayed.

According to the fourth embodiment, the user is prompted to input the identification number of the fixing unit 203 to be replaced. Therefore, it is possible to prevent a fixing unit different from the setting of the type of the fixing unit to be replaced from being erroneously mounted. Further, since the user is prompted to prepare the fixing unit to be replaced by requesting the user to input the identification number, the fixing unit to be replaced is prepared at hand by the user before the power is turned off, and as a result, it is possible to prevent the fixing unit of a different unit type from being erroneously mounted.

The present disclosure is not limited to the embodiments and modifications as described above, but is diversely changeable. Namely, the technical scope of the present disclosure also includes an embodiment acquired by combining technical measures modified as appropriate without departing from the gist of the present disclosure.

A program that operates in each apparatus in the embodiments is a program (a program that causes a computer to function) that controls a CPU or the like in such a way as to achieve the above-described functions of the embodiments. Information to be handled by these devices is temporarily accumulated in a temporary storage device (for example, a RAM) during processing the information, is then stored in various storage devices such as a read only memory (ROM) and an HDD, and is read, modified, and written by the CPU as necessary.

Here, a recording medium for storing the program may be any of a semiconductor medium (e.g., a ROM or a non-volatile memory card, etc.), an optical recording medium/magneto-optical recording medium (e.g., digital versatile disc (DVD), a magneto optical disc (MO), a mini disc (MD), a compact disc (CD), and a Blu-ray (registered trademark) disc (BD), etc.), and a magnetic recording medium (e.g., a magnetic tape and a flexible disk, etc.). Further, not only the functions according to the above-described embodiments are achieved by executing the loaded program, but also the functions according to the present disclosure may be achieved by performing processing in cooperation with an operating system, another application program, or the like, based on instructions of the program.

In addition, in a case where the program is distributed in the market, the program can be stored in a portable recording medium and distributed, or can be transferred to a server computer connected via a network such as the Internet. In this case, of course, the storage device of the server computer is also included in the present disclosure.

While there have been described what are at present considered to be certain embodiments of the disclosure, it will be understood that various modifications may be made thereto, and it is intended that the appended claims cover all such modifications as fall within the true spirit and scope of the disclosure.

What is claimed is:

1. An image forming apparatus comprising:

one or more controllers;

a display; and a fixing unit, wherein the fixing unit is attachable to, and detachable from, the image forming apparatus, and when a first fixing unit, that is mounted on the image forming apparatus, is replaced with a second fixing unit, different from the first fixing unit, the one or more controllers display, on the display, a fixing unit designation request screen that requests an input for designating the second fixing unit, in such a manner that the first fixing unit is identifiable.

2. The image forming apparatus according to claim 1, wherein the one or more controllers display, on the display, the fixing unit designation request screen before a temperature of the first fixing unit is lowered to a predetermined temperature.

3. The image forming apparatus according to claim 1, wherein the one or more controllers display, on the display, the fixing unit designation request screen after a temperature of the first fixing unit is lowered to a predetermined temperature.

4. The image forming apparatus according to claim 1, wherein the fixing unit designation request screen further requests an input for designating a type of the second fixing unit.

5. The image forming apparatus according to claim 4, wherein the type includes a type determined based on a difference in a configuration of the second fixing unit.

6. The image forming apparatus according to claim 1, wherein the one or more controllers display, on the display, the fixing unit designation request screen, in such a manner that a type of the first fixing unit is displayed.

7. The image forming apparatus according to claim 1, wherein the second fixing unit has a type display indicating a type of the second fixing unit, and the one or more controllers display, on the display, a fixing unit type confirmation request that requests a confirmation of a description of the type display.

8. The image forming apparatus according to claim 1, wherein the second fixing unit has an identification information display indicating identification information of the fixing unit, and the one or more controllers determine a type of the second fixing unit, based on the identification information being input according to the identification information display.

9. An image forming apparatus comprising:

one or more controllers;

a display; and a fixing unit, wherein the fixing unit is attachable to, and detachable from, the image forming apparatus, when a first fixing unit, that is mounted on the image forming apparatus, is replaced with a second fixing unit, different from the first fixing unit, the one or more controllers display, on the display, a fixing unit designation request screen that requests an input for designating a type of the second fixing unit, and the type includes a type determined, by a user, based on a sheet width orthogonal to a transport direction of a sheet on which an image is to be fixed by using the second fixing unit.

10. A method of operating an image forming apparatus, the image forming apparatus including one or more controllers, a display, and a fixing unit that is mountable to, and detachable from, the image forming apparatus, the method comprising:

a detaching a first fixing unit, that is mounted to the image forming apparatus, from the image forming apparatus;

mounting a second fixing unit, different from the first fixing unit, to the image forming apparatus; and displaying, by the one or more controllers, on the display, a fixing unit designation request screen that requests an input for designating the second fixing unit, in such a manner that the first fixing unit is identifiable.

* * * * *